US012706288B2

(12) United States Patent
Kawai et al.

(10) Patent No.: US 12,706,288 B2
(45) Date of Patent: Aug. 11, 2026

(54) PHOTOELECTRIC CONVERSION DEVICE AND PHOTOELECTRIC CONVERSION METHOD

(71) Applicant: HAMAMATSU PHOTONICS K.K., Hamamatsu-shi (JP)

(72) Inventors: Naoya Kawai, Hamamatsu-shi (JP); Hideaki Yoshiara, Hamamatsu-shi (JP); Simon Lehnskov Lange, Copenhagen NV (DK); Peter Uhd Jepsen, Copenhagen S (DK)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 248 days.

(21) Appl. No.: 18/682,276

(22) PCT Filed: Aug. 5, 2022

(86) PCT No.: PCT/EP2022/072103
§ 371 (c)(1),
(2) Date: Feb. 8, 2024

(87) PCT Pub. No.: WO2023/016941
PCT Pub. Date: Feb. 16, 2023

(65) Prior Publication Data

US 2024/0355572 A1 Oct. 24, 2024

(30) Foreign Application Priority Data

Aug. 10, 2021 (EP) .................................... 21190597

(51) Int. Cl.
*H01J 43/08* (2006.01)
*H01J 40/06* (2006.01)
*H01J 40/14* (2006.01)

(52) U.S. Cl.
CPC .............. *H01J 43/08* (2013.01); *H01J 40/06* (2013.01); *H01J 40/14* (2013.01)

(58) Field of Classification Search
None
See application file for complete search history.

(56) References Cited

U.S. PATENT DOCUMENTS 7,851,761 B2 * 12/2010 Popa-Simil ............ H01Q 19/30 250/341.1
8,446,094 B2 * 5/2013 Niigaki .................. H01J 31/48 313/542

(Continued)

FOREIGN PATENT DOCUMENTS

EP 3863038 A1 * 8/2021 .............. H01J 40/16
JP 2008-016294 A 1/2008

(Continued)

OTHER PUBLICATIONS

S.L.Lange, N.Kawai and P.U.Jepsen. "A photomultiplier tube with sensitivity in the entire terahertz- and infrared frequency range." IRMMW-THz Conference, Sep. 2019 (Year: 2019).*

(Continued)

*Primary Examiner* — Thomas R Artman
(74) *Attorney, Agent, or Firm* — Faegre Drinker Biddle & Reath LLP

(57) ABSTRACT

A photoelectric conversion device is provided with an electron emitter including a meta-surface emitting an electron in response to incidence of an electromagnetic wave. The meta-surface includes a plurality of photoelectric conversion units having a sensitivity for electromagnetic waves having mutually different wavelength regions. The plurality of photoelectric conversion units respectively include patterns having mutually different configurations.

17 Claims, 11 Drawing Sheets

(56) References Cited

U.S. PATENT DOCUMENTS

| | | | | |
|---|---|---|---|---|
| 8,482,197 | B2 * | 7/2013 | Niigaki | H01J 40/06 313/523 |
| 9,983,125 | B2 * | 5/2018 | Iwaszczuk | G01J 3/28 |
| 10,062,554 | B2 * | 8/2018 | Conley | H01J 43/246 |
| 10,236,165 | B2 * | 3/2019 | Conley | H01J 43/246 |
| 12,354,858 | B2 * | 7/2025 | Miyazaki | H01J 40/16 |
| 12,400,821 | B2 * | 8/2025 | Kawai | H01J 1/34 |
| 2007/0222693 | A1 | 9/2007 | Popa-Simil | |
| 2008/0042563 | A1 * | 2/2008 | Niigaki | H01J 31/48 313/542 |
| 2010/0148667 | A1 * | 6/2010 | Niigaki | H01J 40/06 313/542 |
| 2016/0216201 | A1 | 7/2016 | Iwaszczuk et al. | |
| 2018/0151338 | A1 | 5/2018 | Conley | |
| 2018/0350574 | A1 * | 12/2018 | Conley | H01J 40/16 |
| 2023/0071586 | A1 * | 3/2023 | Miyazaki | H01J 40/16 |
| 2024/0355572 | A1 * | 10/2024 | Kawai | H01J 40/06 |
| 2024/0355601 | A1 * | 10/2024 | Kawai | H01J 43/06 |
| 2024/0363302 | A1 * | 10/2024 | Kawai | H01J 43/06 |

FOREIGN PATENT DOCUMENTS

| | | | |
|---|---|---|---|
| JP | 2017-215330 | A | 12/2017 |
| JP | 2021-009767 | A | 1/2021 |
| WO | 2020/262254 | A1 | 12/2020 |

OTHER PUBLICATIONS

Lange, Simon L. et al., "A terahertz and infrared sensitive photomultiplier tube with a fieldmixing photocathode," 2020 45th International Conference on Infrared, Millimeter, and Terahertz Waves (IRMMW-THZ), IEEE, Nov. 8, 2020, p. 1.

Turchetti, M. et al., "Low-Energy Optical Pulse Detection using Biased Plasmonic Nanoantennas," 2020 Conference on Lasers and Electro-Optics (CLEO), OSA, May 10, 2020, pp. 1-2.

Written Opinion Of the International Searching Authority mailed Oct. 14, 2022 for PCT/EP2022/072103.

Lange, "Terahertz-Enabled Ultrafast Electron Field Emission", DTU Library, DK, 2020, pp. 125-162, 39 Pages.

* cited by examiner

PHOTOELECTRIC CONVERSION DEVICE AND PHOTOELECTRIC CONVERSION METHOD

TECHNICAL FIELD

An aspect of the present invention relates to a photoelectric conversion device and a photoelectric conversion method.

BACKGROUND

Typically there are four types of electron emission such as thermionic emission, photoelectric emission, secondary emission, and field emission. The thermionic emission is achieved by heating electrode. The photoelectric emission is achieved by application of photons. The secondary emission is achieved by bombarding light speed electron. The field emission is achieved in the presence of electrostatic field. US Patent Application Publication No.

2016/0216201 describes an electromagnetic wave detection system which detects an electromagnetic wave. The system includes a photoelectric conversion device which converts an electromagnetic wave into an electron. The photoelectric conversion device is provided with an electron emitter having a metamaterial structure. The system detects an electromagnetic wave entering the electron emitter.

SUMMARY

The electron emitter of the photoelectric conversion device mentioned above emits an electron in response to incidence of the electromagnetic wave. The system detects the entered electromagnetic wave on the basis of the electron emitted from the electron emitter. According to the system having the structure mentioned above, for example, an electromagnetic wave in a wavelength region between a so-called millimeter wave and an infrared light can be detected.

The detection of the electromagnetic wave in the wavelength region between the millimeter wave and the infrared light is thought to be available for various uses. For example, if the electromagnetic wave is transmitted to a gas and a wavelength component absorbed in the gas is identified, a gas component can be identified based on the identified wavelength component. The wavelength components corresponding to various gas components are included in the wavelength region between the millimeter wave and the infrared light. Therefore, the wavelength region is also called as a fingerprint region of a molecule. If the entire wavelength region mentioned above can be detected, plural kinds of gases can be easily detected.

As mentioned above, in order to respond to the various uses, it can be thought to enlarge a range of wavelength of an electromagnetic wave detectable in one electromagnetic wave detection device. In the example mentioned above, it can be thought to enlarge a range of wavelength of the electromagnetic wave detectable in the electromagnetic wave detection device, to a range of wavelength which covers wavelength components corresponding to each of the plural kinds of gas components. In order to enlarge the range of wavelength of the electromagnetic wave detectable in the electromagnetic wave detection device, it can be thought to enlarge a range of wavelength of the electromagnetic wave convertible into an electron in the photoelectric conversion device.

An object of an aspect of the present invention is to provide a photoelectric conversion device capable of enlarging a range of wavelength of an electromagnetic wave convertible into an electron. An object of the other aspect of the present invention is to provide a photoelectric conversion method capable of enlarging a range of wavelength of an electromagnetic wave convertible into an electron.

A photoelectric conversion device according to an aspect of the present invention is provided with an electron emitter including a meta-surface emitting an electron in response to incidence of an electromagnetic wave. The meta-surface includes a plurality of photoelectric conversion units having a sensitivity for electromagnetic waves having mutually different wavelength regions. The plurality of photoelectric conversion units respectively include patterns having mutually different configurations.

In the photoelectric conversion device, the electron emitter includes the meta-surface emitting an electron in response to incidence of the electromagnetic wave. The meta-surface includes a plurality of photoelectric conversion units having the sensitivity for electromagnetic waves having mutually different wavelength regions. The plurality of photoelectric conversion units respectively include patterns having mutually different configurations. As a result, the photoelectric conversion device has the sensitivity for electromagnetic waves having mutually different wavelength regions in the plurality of photoelectric conversion units. Therefore, in the photoelectric conversion device, the range of wavelength of the electromagnetic wave convertible into the electron is enlarged.

In the aspect mentioned above, the pattern of each of the photoelectric conversion units may include first and second sections being spaced away from each other. The second section may include a leading end facing the first section. The second section may be configured to emit the electron in response to incidence of the electromagnetic wave when a lower electric potential than the electric potential of the first section is applied to the second section. In this case, the range of wavelength of the electromagnetic wave which allows the electron to be emitted from the photoelectric conversion device can be controlled by controlling the application of the electric potential to the first section and the second section.

In the aspect mentioned above, the second section of each of the photoelectric conversion units may include a linear part extending toward the first section. The linear parts of at least two photoelectric conversion units among the plurality of photoelectric conversion units may have mutually different lengths. The wavelength region of the electromagnetic wave which causes the emittance of the electron in each of the photoelectric conversion units changes in correspondence to the length of the linear part mentioned above. Therefore, the range of wavelength of the electromagnetic wave convertible into the electron in the photoelectric conversion device can be enlarged with a simple configuration.

In the aspect mentioned above, in two photoelectric conversion units among the plurality of photoelectric conversion units, the first or second section of one photoelectric conversion unit may be electrically connected to the first or second section of the other photoelectric conversion unit. In this case, the range of wavelength of the electromagnetic wave convertible into the electron in the photoelectric conversion device can be enlarged with a simple configuration.

In the aspect mentioned above, the photoelectric conversion device may be further provided with a potential control unit configured to control electric potentials applied to the first and second sections in each of the photoelectric conversion units. In this case, the photoelectric conversion unit to be operated can be selected by the potential control unit.

In the aspect mentioned above, the plurality of photoelectric conversion units may include a first photoelectric conversion unit and a second photoelectric conversion unit. The potential control unit may be configured to control electric potentials applied to the first and second sections of the first photoelectric conversion unit and the first and second sections of the second photoelectric conversion unit. An electric potential difference between an electric potential applied to the first section of the first photoelectric conversion unit and an electric potential applied to the second section of the first photoelectric conversion unit, and an electric potential difference between an electric potential applied to the first section of the second photoelectric conversion unit and an electric potential applied to the second section of the second photoelectric conversion unit may be different from each other. In this case, the first photoelectric conversion unit and the second photoelectric conversion unit are separately operated. Therefore, the photoelectric conversion device can change the range of wavelength of the electromagnetic wave convertible into the electron.

In the aspect mentioned above, the potential control unit may be configured to apply a higher electric potential than the electric potential applied to the first section of the first photoelectric conversion unit to the second section of the first photoelectric conversion unit in a case of applying a lower electric potential than the electric potential applied to the first section of the second photoelectric conversion unit to the second section of the second photoelectric conversion unit. In this case, the emission of the electron in response to incidence of the electromagnetic wave from the first photoelectric conversion unit can be securely stopped while an electron can be emitted from the second photoelectric conversion unit in response to incidence of the electromagnetic wave.

In the aspect mentioned above, the potential control unit may be configured to apply a lower electric potential than the electric potential applied to the first section to the second section with regard to at least two photoelectric conversion units among the photoelectric conversion units.

In this case, at least two photoelectric conversion units mentioned above are simultaneously operated. Therefore, converting electromagnetic waves in the wavelength regions respectively corresponding to the plurality of photoelectric conversion units into the electron can be simultaneously executed.

In the aspect mentioned above, the pattern of each of the photoelectric conversion units may be an equivalent electric potential. In this case, the range of wavelength of the electromagnetic wave convertible into the electron in the photoelectric conversion device can be enlarged with a simple configuration.

In the aspect mentioned above, the pattern of each of the photoelectric conversion units may be electrically connected to each other.

In this case, the range of wavelength of the electromagnetic wave convertible into the electron in the photoelectric conversion device can be enlarged with a simpler configuration.

In the aspect mentioned above, the pattern of each of the photoelectric conversion units may include a linear part. The linear parts of at least two photoelectric conversion units among the plurality of photoelectric conversion units may have mutually different lengths. The wavelength region of the electromagnetic wave which causes the emittance of the electron in each of the photoelectric conversion units changes in correspondence to the length of the linear part. As a result, the range of wavelength of the electromagnetic wave convertible into the electron in the photoelectric conversion device can be enlarged with a simple configuration.

In the aspect mentioned above, there may be further provided with a housing configured to be airtightly sealed and have a window transmitting the electromagnetic wave. The electron emitter may be disposed within the housing. In this case, an amount of emission of the electron in response to incidence of the electromagnetic wave can be improved by making the housing vacuum or filling the housing with gas.

A photoelectric conversion method according to the other aspect of the present invention includes making an electromagnetic wave to be measured enter a meta-surface including a plurality of photoelectric conversion units, and emitting an electron from at least one photoelectric conversion unit corresponding to wavelength regions of the electromagnetic wave to be measured among the plurality of photoelectric conversion units. The plurality of photoelectric conversion units respectively include patterns having mutually different configurations.

In the photoelectric conversion method, the electromagnetic wave to be measured enters the meta-surface including the plurality of photoelectric conversion units. The plurality of photoelectric conversion units respectively include patterns having mutually different configurations. The electron is emitted from at least one photoelectric conversion unit corresponding to the wavelength regions of the electromagnetic wave to be measured. In this case, the range of wavelength of the electromagnetic wave convertible into the electron is enlarged.

In the other aspect mentioned above, the photo electric conversion method further may include controlling electric potentials applied to the plurality of photoelectric conversion units. The pattern of each of the photoelectric conversion units may include a first section and a second section which are spaced away from the first section and have a leading end facing the first section. Each of the photoelectric conversion units may emit the electron in response to incidence of the electromagnetic wave in a state where a lower electric potential than an electric potential applied to the first section is applied to the second section. Electric potentials applied to the first and second sections of each of the photoelectric conversion units may be controlled. In this case, the photoelectric conversion unit to be operated is selected by the control of the electric potential applied to the first and second sections of each of the photoelectric conversion units.

In the other aspect mentioned above, electric potentials applied to the first photoelectric conversion unit and the second photoelectric conversion unit which are included in the plurality of photoelectric conversion units may be controlled. The electric potential may be applied in such a manner that an electric potential difference between an electric potential applied to the first section of the first photoelectric conversion unit and an electric potential applied to the second section of the first photoelectric conversion unit is different from an electric potential difference between an electric potential applied to the first section of the second photoelectric conversion unit and an electric potential applied to the second section of the second photoelectric conversion unit. In this case, since the electric potentials respectively applied with respect to the first photoelectric conversion unit and the second photoelectric conversion unit are controlled, the first photoelectric conversion unit and the second photoelectric conversion unit can be separately operated.

In the other aspect mentioned above, a higher electric potential than an electric potential applied to the first section of the first photoelectric conversion unit may be applied to the second section of the first photoelectric conversion unit in a case where a lower electric potential than an electric potential applied to the first section of the second photoelectric conversion unit is applied to the second section of the second photoelectric conversion unit. In a case where a lower electric potential than the electric potential applied to the first section of the first photoelectric conversion unit is applied to the second section of the first photoelectric conversion unit, a higher electric potential than the electric potential applied to the first section of the second photoelectric conversion unit may be applied to the second section of the second photoelectric conversion unit. In this case, while one of the first and second photoelectric conversion units emits the electron in response to incidence of the electromagnetic wave, the emission of the electron in response to incidence of the electromagnetic wave from the other can be securely stopped.

In the other aspect mentioned above, in at least two photoelectric conversion units among the plurality of photoelectric conversion units, a lower electric potential than the electric potential applied to the first section may be applied to the second section. In this case, the plurality of photoelectric conversion units are simultaneously operated. Therefore, the conversion of the electromagnetic waves having the wavelengths respectively corresponding to the plurality of photoelectric conversion units can be simultaneously executed.

According to one aspect of the present invention, it is possible to provide the photoelectric conversion device capable of enlarging a range of wavelength of an electromagnetic wave convertible into the electron. According to the other aspect of the present invention, it is possible to provide the photoelectric conversion method capable of enlarging a range of wavelength of the electromagnetic wave convertible into the electron.

DETAILED DESCRIPTION

Figure 1:
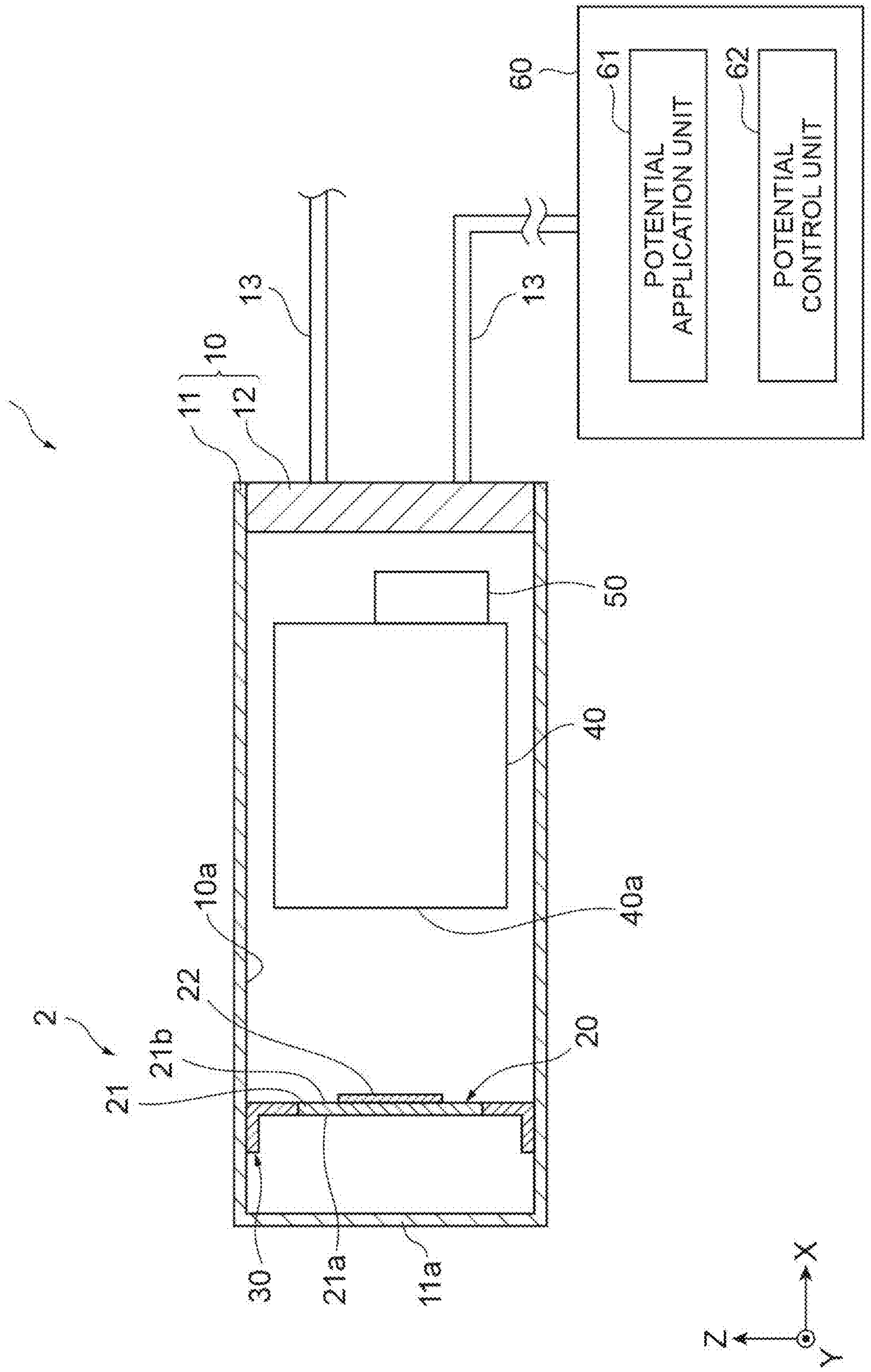
FIG. 1 is a perspective view of an electromagnetic wave detection device according to a first embodiment.

Hereinafter, first and second embodiments of the present invention will be described in detail with reference to the accompanying drawings. In the following description, the same elements or corresponding elements will be denoted with the same reference numerals and a redundant explanation will be omitted.

First Embodiment

First, a configuration of an electromagnetic wave detection device according to the first embodiment will be described with reference to FIG. 1. FIG. 1 is a perspective view of the electromagnetic wave detection device according to the first embodiment.

An electromagnetic wave detection device 1 detects an entered electromagnetic wave. The electromagnetic wave detection device 1 includes a photoelectric conversion device 2. The photoelectric conversion device 2 emits an electron in response to incidence of the electromagnetic wave. In the present specification, the term "light" includes the other electromagnetic waves than a visible light. In the present embodiment, the electromagnetic wave detection device 1 detects the entered electromagnetic wave based on the electron emitted from the photoelectric conversion device 2 in response to incidence of the electromagnetic wave. The photoelectric conversion device 2 emits the electron, for example, in response to the incidence of the electromagnetic wave having a range of wavelength between a so-called millimeter wave and an infrared light. The range of wavelength between the millimeter wave and the infrared light corresponds, for example, to a frequency range between about 0.01 and 150 THz. In the present specification, the term "range of wavelength" may include a range of a plurality of wavelength regions separated from each other, or may be a range of one continuous wavelength region. The photoelectric conversion device 2 emits the electron, for example, according to an electron field emission (field emission).

The electromagnetic wave detection device 1 is, for example, an electron tube which outputs an electric signal in response to incidence of an electromagnetic wave. For example, the electromagnetic wave detection device 1 emits an electron in response to incidence of the electromagnetic wave, detects the emitted electron and outputs an electric signal based of the result of detection, in an inner portion of the electron tube. The electron tube is, for example, a photomultiplier tube (PMT). The electromagnetic wave detection device 1 emits the electron in the inner portion when the electromagnetic wave enters, and multiplies the emitted electron. According to a modification of the present embodiment, the electromagnetic wave detection device 1 may not be provided with a configuration for detecting the electron in the electron tube. In other words, the electromagnetic wave detection device 1 may be provided with an electron tube emitting the electron to an outer portion in response to incidence of the electromagnetic wave as the photoelectric conversion device 2, and may be provided with a sensor detecting the electron emitted from the electron tube in an outer portion of the electron tube.

The electromagnetic wave detection device 1 is provided with a housing 10, an electron emitter 20, a holder 30, an electron multiplying unit 40, an electron collecting unit 50, and a power supply unit 60. The electron emitter 20, the holder 30, the electron multiplying unit 40 and the electron collecting unit 50 are disposed in the housing 10. The photoelectric conversion device 2 is provided with the housing 10, the electron emitter 20 and the power supply unit 60, and configures a part of the electromagnetic wave detection device 1.

The housing 10 has a valve 11 and a stem 12. The inner portion of the housing 10 is airtightly sealed by the valve 11 and the stem 12. In the present embodiment, the inner portion of the housing 10 is held in a vacuum. The vacuum in the housing 10 may not be an absolute vacuum, but may be a state where the housing is filled with gas having a lower pressure than an atmospheric pressure. For example, the inner portion of the housing 10 is held at $1\times10^{-4}$ to $1\times10^{-7}$ Pa.

The valve 11 includes a window unit 11*a* having an electromagnetic wave transparency. In the present specification, the term "electromagnetic wave transparency" means a property of transmitting at least a partial frequency range of wavelength of the range of wavelength of the entered electromagnetic wave. In the present embodiment, the housing 10 has a circular cylindrical shape. The housing 10 extends in a direction of X-axis as illustrated in FIG. 1. The stem 12 configures a bottom surface of the housing 10. The stem 12 configures, for example, one end surface of the housing 10 in the direction of X-axis. The valve 11 configures a side surface of the housing 10 and a bottom surface facing the stem 12.

The window unit 11*a* configures a bottom surface facing the stem 12. For example, the window unit 11*a* is formed into a circular shape as viewed from the direction of X-axis while setting a direction of YZ axis to a diametrical direction. A frequency characteristic of transmittance of the electromagnetic wave is different depending on a material. Therefore, the window unit 11*a* is configured by an appropriate material depending on a frequency range of the electromagnetic wave entering the housing 10. For example, the material of the window unit 11*a* includes at least one selected from quartz, silicon, germanium, sapphire, zinc selenide, zinc sulfide, magnesium fluoride, lithium fluoride, barium fluoride, calcium fluoride, magnesium oxide, calcium carbonate, diamond and chalcogenide glass. Therefore, an electromagnetic wave having an arbitrary frequency range between millimeter wave and infrared light can be guided into the inner portion of the housing 10. For example, the quartz is suitable for a material of a member transmitting an electromagnetic wave having a frequency range of 0.1 to 5 THz, the silicon is suitable for a material of a member transmitting an electromagnetic wave having a frequency range of 0.04 to 11 THz and 46 THz or more, the magnesium fluoride is suitable for a material of a member transmitting an electromagnetic wave having a frequency range of 40 THz or more, the germanium is suitable for a material of a member transmitting an electromagnetic wave having a frequency range of 13 THz or more, and the zinc selenide is suitable for a material of a member transmitting an electromagnetic wave having a frequency range of 14 THz or more.

The housing 10 further has a plurality of wires 13 for enabling electrical connection between an outer portion and an inner portion of the housing 10. The plurality of wires 13 are, for example, lead wires or pins. In the present embodiment, the plurality of wires 13 are pins penetrating the stem 12 and extend from the inner portion of the housing 10 to the outer portion thereof. At least one of the plurality of wires 13 is connected to various members provided in the inner portion of the housing 10.

The electron emitter 20 emits the electron in response to incidence of the electromagnetic wave. The electron emitter 20 is provided with a supporting body 21. The supporting body 21 has, for example, a plate shape. The supporting body 21 is formed, for example, into a rectangular shape in plan view. The supporting body 21 has a principal surface 21*a* and a principal surface 21*b* facing each other. The principal surface 21*a* and the principal surface 21*b* are surfaces of the supporting body 21 which are positioned in opposite sides to each other. The principal surface 21*a* and the principal surface 21*b* are, for example, flat surfaces, and are formed into a rectangular shape in planar view. The principal surface 21 a and the principal surface 21*b* are disposed in parallel to the window unit 11*a*. The principal surface 21*a* faces the window unit 11*a*. The electromagnetic wave passing through the window unit 11*a* enters the principal surface 21*a*.

The supporting body 21 has an electromagnetic wave transparency with respect to the electromagnetic wave passing through the window unit 11*a*. As a result, the supporting body 21 transmits at least partial frequency range of the electromagnetic wave passing through the window unit 11*a*. The supporting body 21 can be made of the same material as the material of the window unit 11*a* mentioned above. The material of the supporting body 21 includes, for example, silicon. In one photoelectric conversion device 2, the supporting body 21 and the window unit 11*a* may not be made of the same material. The supporting body 21 is spaced away from the window unit 11*a* and the electron multiplying unit 40.

The electron emitter 20 has a meta-surface 22. The meta-surface 22 is provided in the supporting body 21. The meta-surface 22 emits the electron in response to incidence of the electromagnetic wave. For example, the meta-surface 22 has a sensitivity for the electromagnetic wave in a range of wavelength between the so-called millimeter wave and the infrared light. The meta-surface 22 also has a sensitivity for terahertz-wave. The range of wavelength of the terahertz-wave corresponds to a frequency range between 100 GHz and 30 THz. The term "having a sensitivity for an electromagnetic wave" means that an electron is emitted in response to incidence of the electromagnetic wave.

For example, the meta-surface 22 includes an oxide layer formed on the principal surface 21*b* of the supporting body 21, and a metal layer formed on the oxide layer. The material of the oxide layer includes, for example, silicon dioxide and titanium oxide. For example, the oxide layer includes a layer including the silicon dioxide, and a layer including the titanium oxide. The material of the metal layer includes, for example, gold. In the present embodiment, the oxide layer is formed on the principal surface 21*b* of the supporting body 21 made of quartz, and the metal layer is formed on the oxide layer. For example, a thickness of the supporting body 21 is 525 μm, a thickness of the layer including the silicon diode in the meta-surface 22 is 1 μm, a thickness of the layer including the titanium dioxide in the meta-surface 22 is 10 nm, and a thickness of the metal layer in the meta-surface 22 is 200 nm. The meta-surface 22 has a rectangular shape in plan view. In the modification of the present embodiment, the meta-surface 22 may be provided on the principal surface 21*a*.

The holder 30 holds the electron emitter 20 in the inner portion of the housing 10. The holder 30 is positioned to the inner surface 10*a* of the housing 10. The holder 30 positions the electron emitter 20 for the housing 10. The holder 30 has a frame shape along the inner surface 10*a* of the housing 10, and a penetration opening is formed in the holder 30. The meta-surface 22 of the electron emitter 20 is disposed in an inner side of an edge defining the penetration opening as seen from an orthogonal direction to the principal surfaces 21*a* and 21*b* of the electron emitter 20.

The electron multiplying unit 40 is disposed in the inner portion of the housing 10, and has an incidence surface 40*a* which the electron emitted from the electron emitter 20 enters. The electron multiplying unit 40 multiplies the electron entering the incidence surface 40*a*. In the present embodiment, the principal surface 21*b* of the electron emitter 20 faces the incidence surface 40*a* of the electron multiplying unit 40. The meta-surface 22 faces the incidence surface 40*a* of the electron multiplying unit 40, and the electron emitted from the meta-surface 22 enters the incidence surface 40*a*. The principal surface 21*a* of the electron emitter 20 faces the window unit 11*a* of the housing 10. The electron multiplying unit 40 has, for example, multistage dynodes.

The electron collecting unit 50 is disposed in the inner portion of the housing 10, and collects the electron which is multiplied by the electron multiplying unit 40. The electron collecting unit 50 is a sensor detecting the electron. The electromagnetic wave detection device 1 detects the electromagnetic wave by detecting the electron in the electron collecting unit 50. In the present embodiment, for example, the electron collecting unit 50 has an anode to which one of a plurality of wires 13 is connected. A predetermined electric potential is applied to the anode through the wire 13. The anode catches the electron which is multiplied by the dynodes of the electron multiplying unit 40. The electron collecting unit 50 may have a diode in place of the anode.

In the present embodiment, the meta-surface 22 is of an active type and is operated by application of bias voltage. The meta-surface 22 is operated by application of electric potentials by means of the power supply unit 60. The power supply unit 60 is electrically connected to the meta-surface 22. The power supply unit 60 includes a potential application unit 61 and a potential control unit 62. The potential application unit 61 applies the electric potential to the meta-surface 22. The potential control unit 62 controls the potential application unit 61. The electric potentials applied to the meta-surface 22 are controlled by the potential control unit 62. The meta-surface 22 is operated in response to the electric potential controlled by the potential control unit 62. In other words, the meta-surface 22 emits the electron in response to the control of electric potential by the potential control unit 62.

The potential control unit 62 is one computer or a plurality of computers, for example, constructed by a hardware and a software such as programs. The potential control unit 62 is provided, for example, with a processor, a main storage unit, an auxiliary storage unit, a communication device and an input device, as the hardware. The processor executes an operating system and an application program. The main storage is constructed by Read Only Memory (ROM) and Random Access Memory (RAM). The auxiliary storage unit is a storage medium which is constructed by a hard disc and a flash memory. The auxiliary storage unit generally stores a larger amount of data than the main storage unit. The communication device is constructed by a network card or a wireless communication module. The input device is constructed by a keyboard, a mouse and a touch panel.

Configuration of Photoelectric Conversion Device

Figure 2:
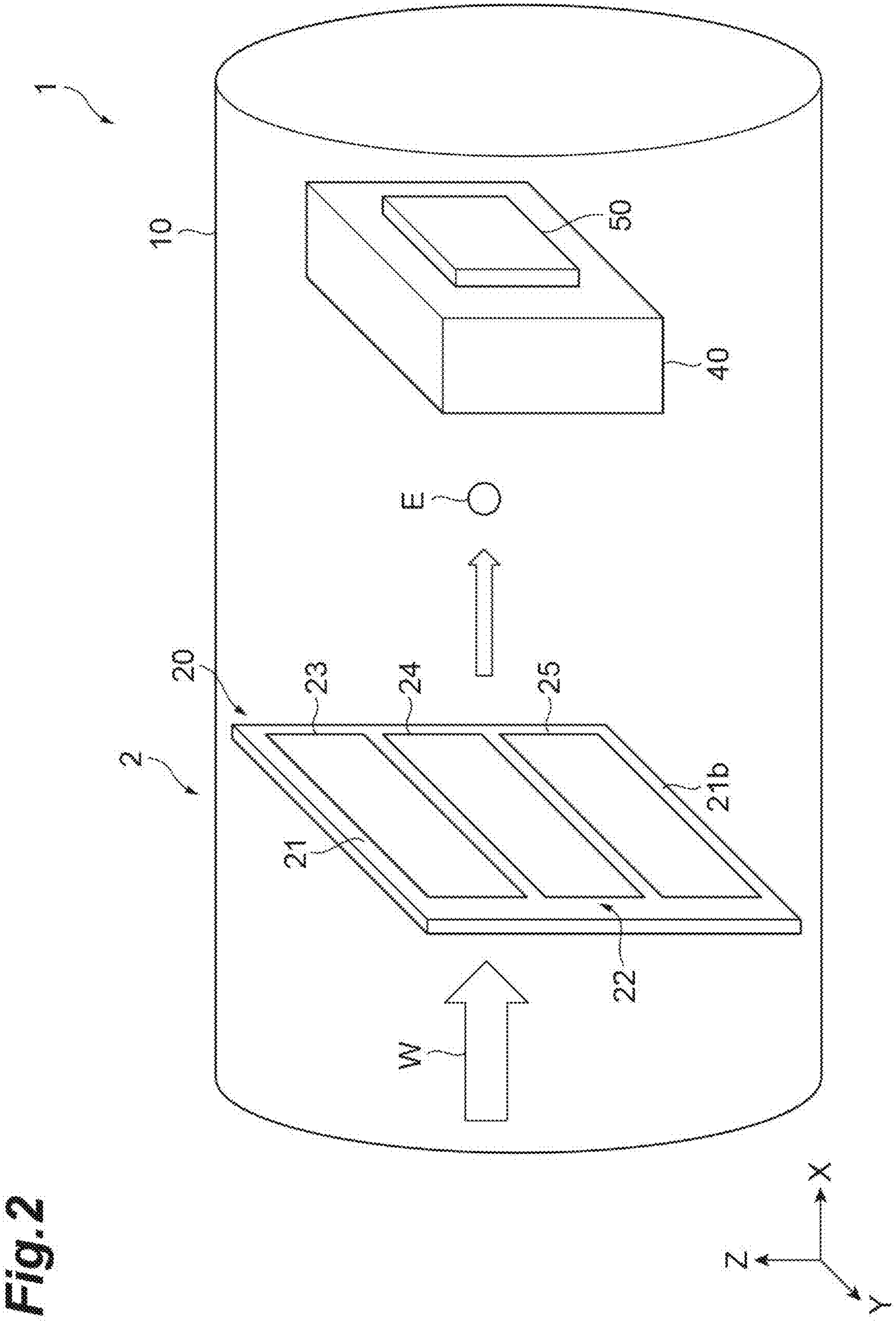
FIG. 2 is a schematic view of a photoelectric conversion device according to first and second embodiments.

Next, the photoelectric conversion device 2 will be described further in detail with reference to FIGS. 2 to 4. FIG. 2 is a schematic view of the photoelectric conversion device. The meta-surface 22 includes a plurality of photoelectric conversion units 23, 24 and 25. The plurality of photoelectric conversion units 23, 24 and 25 respectively emit the electron in response to incidence of the corresponding wavelengths. The plurality of photoelectric conversion units 23, 24 and 25 emit the electron in response to incidence of the electromagnetic waves having mutually different wavelength regions. In other words, the plurality of photoelectric conversion units 23, 24 and 25 have the sensitivity for the electromagnetic waves having mutually different wavelength regions. The term "mutually different wavelength regions" includes a case where the plurality of wavelength regions overlap each other, and a case where the plurality of wavelength regions are separated from each other.

The meta-surface 22 includes, for example, three photoelectric conversion units 23, 24 and 25. The meta-surface 22 may include two or four or more photoelectric conversion units corresponding to the electromagnetic waves having mutually different wavelength regions. The meta-surface 22 may include a plurality of photoelectric conversion units corresponding to the electromagnetic waves in the same wavelength region. In other words, the meta-surface 22 may have the sensitivity for the electromagnetic waves in the same wavelength region. For example, the photoelectric conversion unit 23 and the photoelectric conversion unit 24 may correspond to the electromagnetic waves in the same wavelength region, and the photoelectric conversion unit 25 may correspond to the electromagnetic wave in a different wavelength region from the photoelectric conversion units 23 and 24.

For example, the photoelectric conversion unit 23 has the sensitivity in a frequency range around a center frequency of 0.5 THz, the photoelectric conversion unit 24 has the sensitivity in a frequency range around a center frequency of 1.0 THz, and the photoelectric conversion unit 25 has the sensitivity in a frequency range around a center frequency of 1.5 THz. The frequency ranges in which the photoelectric conversion units 23, 24 and 25 have the sensitivities are not limited to them. For example, the photoelectric conversion unit 23 may have the sensitivity in a frequency range around a center frequency of 0.5 THz, the photoelectric conversion unit 24 may have the sensitivity in a frequency range around a center frequency of 10 THz, and the photoelectric conversion unit 25 may have the sensitivity in a frequency range around a center frequency of 100 THz.

In the example illustrated in FIG. 2, the electromagnetic wave W entering the housing 10 enters the photoelectric conversion units 23, 24 and 25. In this case, the photoelectric conversion unit corresponding to the wavelength of the electromagnetic wave W among the photoelectric conversion units 23, 24 and 25 emits an electron E in response to incidence of the electromagnetic wave W. The electron E emitted from at least one of the photoelectric conversion units 23, 24 and 25 enters the electron multiplying unit 40. The electron multiplied in the electron multiplying unit 40 is collected in the electron collecting unit 50.

Figure 3:
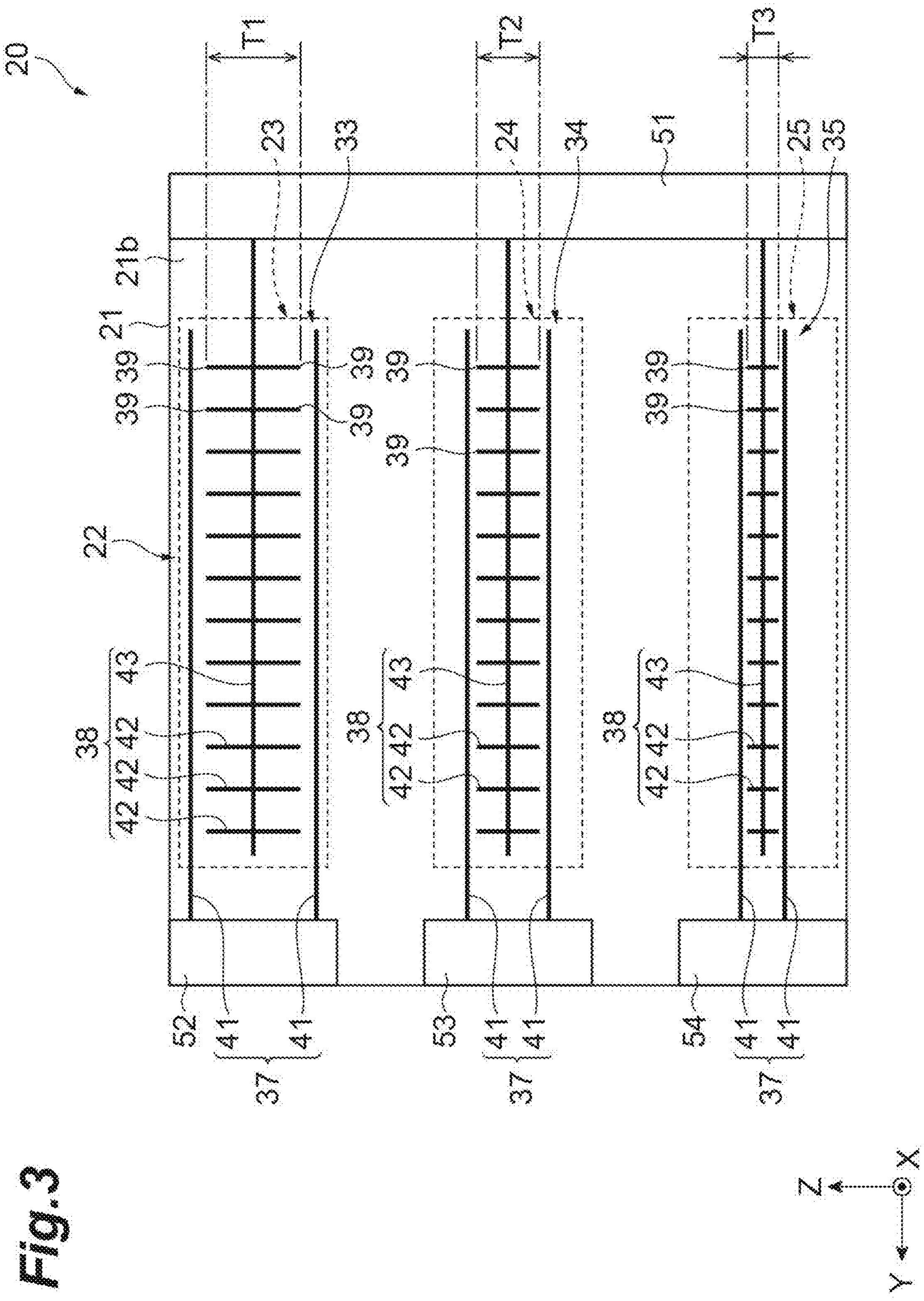
FIG. 3 is a plan view of an electron emitter according to the first embodiment.

FIG. 3 is a plan view of the electron emitter. As illustrated in FIG. 3, the plurality of photoelectric conversion units 23, 24 and 25 in the meta-surface 22 respectively include patterns having mutually different configurations. The term "configuration" includes various attributes such as a shape and a material. Each of the patterns is disposed on the principal surface 21*b* of the supporting body 21. In the present embodiment, the respective patterns have mutually different shapes. The term "having mutually different shapes" includes having mutually different sizes.

In the present embodiment, the respective photoelectric conversion units 23, 24 and 25 include patterns 33, 34 and 35 having mutually different shapes. The photoelectric conversion unit 23 includes the pattern 33, the photoelectric conversion unit 24 includes the pattern 34, and the photoelectric conversion unit 25 includes the pattern 35. Each of the patterns 33, 34 and 35 is a conductive line and conducts the electron. Each of the patterns 33, 34 and 35 includes the metal layer which is formed at least on the oxide layer of the meta-surface 22. The material of the metal layer includes, for example, gold.

Each of the patterns 33, 34 and 35 includes a first section 37 and a second section 38. The first section 37 and the second section 38 are spaced away from each other. The second section 38 extends toward the first section 37. The second section 38 includes a leading end 39 facing the first section 37. In each of the patterns 33, 34 and 35, the first section 37 and the second section 38 are connected via the oxide layer. In each of the patterns 33, 34 and 35, the first section 37 and the second section 38 are separated by the oxide layer, and are insulated from each other at least when the photoelectric conversion device 2 is not operated. The second section 38 emits the electron in response to incidence of the electromagnetic wave in a state where a lower electric potential than an electric potential of the first section 37 is applied.

In the example illustrated in FIG. 3, the first section 37 of each of the patterns 33, 34 and 35 includes a pair of linear parts 41 extending in a direction of Y-axis. Each of the linear parts 41 is formed, for example, into a linear shape. The pair of linear parts 41 are in parallel to each other. The second section 38 of each of the patterns 33, 34 and 35 includes a plurality of linear parts 42 extending in a direction of Z-axis, and a linear part 43 extending in a direction of Y-axis and connecting the plurality of linear parts 42.

The plurality of linear parts 42 are disposed between the pair of linear parts 41 in each of the patterns 33, 34 and 35. The plurality of linear parts 42 extend from the linear part 43 toward the corresponding first section 37. Each of the linear parts 42 is formed, for example, into a linear shape. The plurality of linear parts 42 are, for example, in parallel to each other. The linear part 43 is formed, for example, into a linear shape. The pair of linear parts 41 are, for example, in parallel to the linear part 43. Each of the linear parts 42 is connected to the linear part 43 at the center thereof. In other words, each of the linear parts 42 extends in a direction of +Z-axis and a direction of −Z-axis from the linear part 43.

In the example illustrated in FIG. 3, each of the linear parts 42 includes a pair of leading ends 39. Each of the leading ends 39 is spaced away from the other linear part 42 and the linear part 43 in the same pattern, and from the other patterns. In each of the patterns 33, 34 and 35, each of the leading ends 39 faces mutually different linear parts 41 in the direction of Z-axis. The shortest distance between each of the leading ends 39 and the first section 37 is smaller than the shortest distance between the position other than the plurality of leading ends 39 in the second section 38 and the first section 37. In other words, the leading end 39 is a portion which is closest to the linear part 41 of the corresponding first section 37 in the linear part 42 including the leading end 39. The leading end 39 is disposed nearer the linear part 41 than the other portions of the pattern including the leading end 39.

In each of the photoelectric conversion units 23, 24 and 25, the linear part 41 configures a bias portion, and the linear part 42 configures an antenna portion. The antenna portion emits the electron in response to incidence of the electromagnetic wave. The bias portion generates an electric field between the bias portion and the corresponding antenna portion when the bias electric potential is applied. When a higher electric potential than the electric potential of the antenna portion is applied to the bias portion, an electric potential barrier in the leading end portion of the bias portion side in the antenna portion becomes thin. When a lower electric potential than the electric potential of the antenna portion is applied to the bias portion, the electric potential barrier in the leading end portion of the bias portion side in the antenna portion becomes thick. A state where a higher electric potential than the electric potential of the antenna portion is applied to the bias portion is called as "forward bias". A state where a lower electric potential than the electric potential of the antenna portion is applied to the bias portion is called as "reverse bias".

When the electromagnetic wave enters the antenna portion, the electric field is induced around the antenna portion. The electric potential barrier at the antenna-vacuum interface becomes thin by the electric field induced around the antenna portion. In a case where the electric potential barrier becomes further thin by the incidence of the electromagnetic wave on the antenna portion in the forward bias state, the electron existing in the antenna portion slips out of the electric potential barrier due to a tunnel effect. The electron slipping out of the electric potential barrier is accelerated by the electric field around the antenna portion. As mentioned above, an emission of an electric field electron can be generated by the incidence of the electromagnetic wave on the antenna portion in the forward bias state. In each of the photoelectric conversion units 23, 24 and 25, the linear part 42 of the second section 38 can emit the electron in response to incidence of the electromagnetic wave in a state where a lower electric potential than the electric potential of the linear part 41 of the first section 37 is applied.

The smaller the size of the antenna portion is, the more an emission of an electric field electron tends to be generated for an electromagnetic wave having a shorter wavelength, that is, an electromagnetic wave having a larger frequency. Each of the photoelectric conversion units 23, 24 and 25 of the meta-surface 22 is configured to correspond to a range of wavelength, for example, between the millimeter wave and the infrared light, according to the change of a configuration of the linear part 42 of the second section 38.

The linear parts 42 of at least two photoelectric conversion units among the plurality of photoelectric conversion units 23, 24 and 25 have mutually different lengths. For example, the linear parts 42 of the plurality of patterns 33, 34 and 35 have mutually different lengths T1, T2 and T3. In other words, the linear part 42 of the photoelectric conversion unit 23, the linear part 42 of the photoelectric conversion unit 24 and the linear part 42 of the photoelectric conversion unit 25 have mutually different lengths T1, T2 and T3. The lengths T1, T2 and T3 of the linear parts 42 in the patterns 33, 34 and 35 are lengths in the direction of Z-axis from one leading ends 39 of the linear parts 42 to the other leading ends 39.

In the pattern 33, the lengths T1 of the plurality of linear parts 42 are the same. In the pattern 34, the lengths T2 of the plurality of linear parts 42 are the same. In the pattern 35, the lengths T3 of the plurality of linear parts 42 are the same. The term "same" includes a length difference in a manufacturing tolerance range. The lengths T1, T2 and T3 of the linear parts 42 in each of the patterns 33, 34 and 35 correspond to the wavelength regions of the electromagnetic waves which allow the electron to be emitted from each of the photoelectric conversion units 23, 24 and 25. The lengths T1, T2 and T3 of the linear parts 42 in each of the patterns 33, 34 and 35 are designed depending on a desired wavelength region which allows the electron to be emitted from each of the photoelectric conversion units 23, 24 and 25. For example, each of the lengths T1, T2 and T3 is a length which is half the length of a center wavelength in the desired wavelength region. In a case where the electromagnetic wave passing through the supporting body 21 enters the linear part 42 such as the present embodiment, a refractive index of the supporting body 21 through which the electromagnetic wave passes is also taken into consideration. For example, in a case where a wavelength of the electromagnetic wave entering the electron tube is 600 μm, and a refractive index of the supporting body 21 is 3.4 for the electromagnetic wave, a wavelength of the electromagnetic wave entering the linear part 42 is 600 μm/3.4=176 μm. Therefore, in this case, the lengths T1, T2 and T3 of 176 μm/2-88 μm is appropriate.

The electron emitter 20 is further provided with a plurality of electrodes 51, 52, 53 and 54 which are spaced away from each other, as illustrated in FIG. 3. The plurality of electrodes 51, 52, 53 and 54 are provided on the principal surface 21*b* of the supporting body 21. The plurality of electrodes 51, 52, 53 and 54 are electrically connected to at least one of the plurality of photoelectric conversion units 23, 24 and 25. In the present embodiment, each of the electrodes 51, 52, 53 and 54 is formed into a rectangular shape. As a modification of the present embodiment, each of the electrodes 51, 52, 53 and 54 may be formed into a linear shape in the same manner as the first section 37 or the second section 38. Each of the electrodes 51, 52, 53 and 54 may be integrally formed with the first section 37 or the second section 38.

For example, the electrode 51 is electrically connected to the second section 38 of each of the photoelectric conversion units 23, 24 and 25. The electrode 52 is electrically connected to the pair of first sections 37 of the photoelectric conversion unit 23. The electrode 53 is electrically connected to the pair of first sections 37 of the photoelectric conversion unit 24. The electrode 54 is electrically connected to the pair of first sections 37 of the photoelectric conversion unit 25.

In two photoelectric conversion units among the plurality of photoelectric conversion units 23, 24 and 25, the first section 37 or the second section 38 of one photoelectric conversion unit may be electrically connected to first section 37 or second section 38 of the other photoelectric conversion unit. For example, in the example illustrated in FIG. 3, the second section 38 of the photoelectric conversion unit 23, the second section 38 of the photoelectric conversion unit 24 and the second section 38 of the photoelectric conversion unit 25 are electrically connected via the electrode 51.

Each of the photoelectric conversion units 23, 24 and 25 is operated by application of electric potentials from the power supply unit 60 via the plurality of electrodes 51, 52, 53 and 54. The potential application unit 61 of the power supply unit 60 applies electric potentials to each of the photoelectric conversion units 23, 24 and 25 via the plurality of electrodes 51, 52, 53 and 54. The potential control unit 62 of the power supply unit 60 controls electric potentials applied to the respective photoelectric conversion units 23, 24 and 25.

Figure 4:
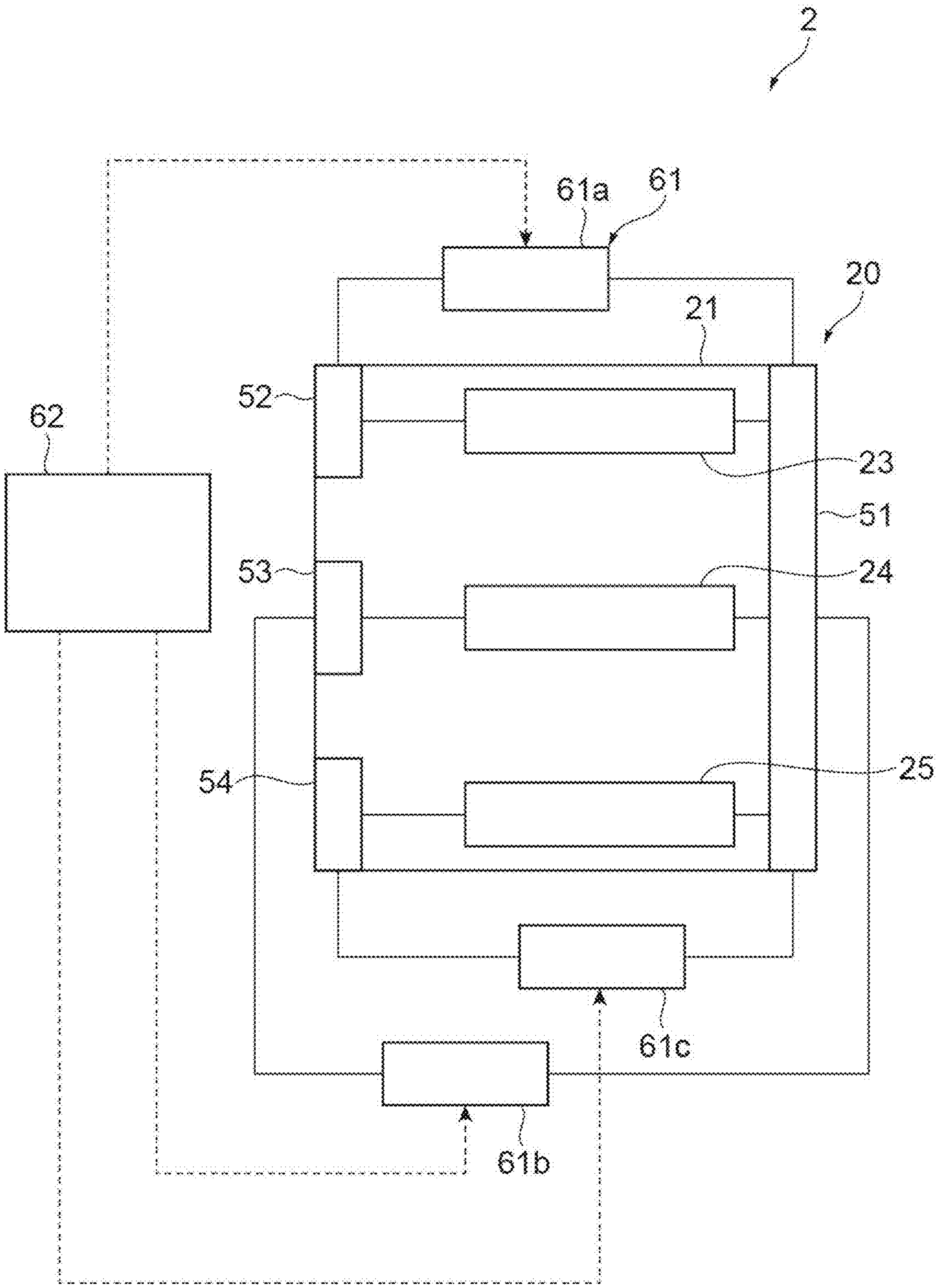
FIG. 4 is a schematic view of the photoelectric conversion device according to the first embodiment.

FIG. 4 is a schematic view for describing the application of the electric potential in the photoelectric conversion device. As illustrated in FIG. 4, the potential application unit 61 includes, for example, a first potential application unit 61*a*, a second potential application unit 61*b* and a third potential application unit 61*c*. The first potential application unit 61*a* applies an electric potential difference between the electrode 51 and the electrode 52. The second potential application unit 61*b* applies an electric potential difference between the electrode 51 and the electrode 53. The third potential application unit 61*c* applies an electric potential difference between the electrode 51 and the electrode 54. The potential control unit 62 controls the first potential application unit 61*a*, the second potential application unit 61*b* and the third potential application unit 61*c*, respectively.

Photoelectric Conversion Method

Figure 5:
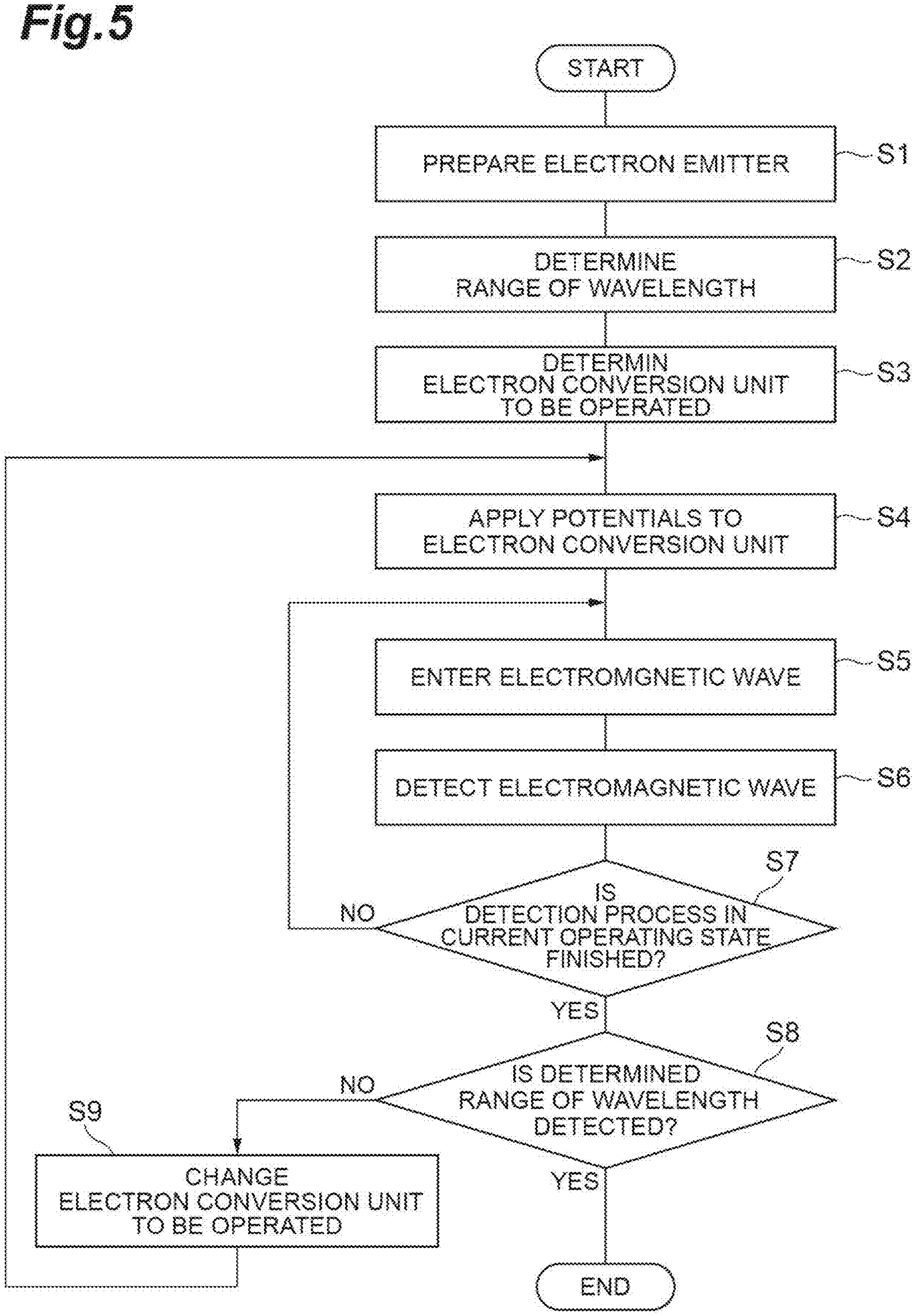
FIG. 5 is a flow chart of an electromagnetic wave detection method according to the first embodiment.

Next, an electromagnetic wave detection method according to the present embodiment will be described with reference to FIG. 5. The electromagnetic wave detection method includes a photoelectric conversion method emitting an electron in response to an incident electromagnetic wave. FIG. 5 is a flow chart of the electromagnetic wave detection method according to the present embodiment. In the electromagnetic wave detection method illustrated in FIG. 5, a range of wavelength to be detected is determined. The range of wavelength to be detected is divided into a plurality of wavelength regions, and the detection is performed for every wavelength region. As a result, the same result as that according to a spectroscopy can be obtained with respect to the determined range of wavelength. In the example illustrated in FIG. 5, the wavelength regions corresponding to the photoelectric conversion units are detected in sequence by respectively operating the plurality of photoelectric conversion units in sequence.

First, an electron emitter 20 is prepared (process S1). For example, an electromagnetic wave detection device 1 with the electron emitter 20 is disposed.

Next, a range of wavelength is determined (process S2). For example, a potential control unit 62 acquires various information from an outer portion, and determines a range of wavelength of an electromagnetic wave to be detected, based on the information. The various information may be input by a user, or may be automatically acquired via communication. The potential control unit 62 may determine the range of wavelength of the electromagnetic wave to be detected, based on various information previously stored.

Next, the photoelectric conversion unit to be operated is determined (process S3). The potential control unit 62 determines the photoelectric conversion unit to be operated, for example, based on the range of wavelength determined in the process S2. The potential control unit 62 determines, for example, at least one of the photoelectric conversion units having the sensitivity in the range of wavelength determined in the process S2, as the photoelectric conversion unit to be operated. For example, the potential control unit 62 determines the photoelectric conversion unit 23 among the plurality of photoelectric conversion units 23, 24 and 25 as an electron change unit which is operated, and determines the photoelectric conversion units 24 and 25 as a photoelectric conversion unit which is not operated.

Next, electric potentials are applied to the photoelectric conversion unit (process S4). The potential control unit 62 determines electric potentials to be applied to the respective electrodes 51, 52, 53 and 54, for example, based on the photoelectric conversion unit which is operated. For example, the potential control unit 62 refers to a previously stored table and acquires the information associated with the photoelectric conversion unit which is operated. The potential control unit 62 determines electric potentials applied to the respective electrodes 51, 52, 53 and 54 on the basis of the acquired information.

For example, the potential control unit 62 controls bias voltages applied to the photoelectric conversion unit which is operated and the photoelectric conversion unit which is not operated, among the plurality of photoelectric conversion units. For example, an electric potential difference between an electric potential applied to the first section 37 and an electric potential applied to the second section 38 in the photoelectric conversion unit which is operated is different from an electric potential difference between an electric potential applied to the first section 37 and an electric potential applied to the second section 38 in the photoelectric conversion unit which is not operated.

The potential control unit 62 determines electric potentials applied to the respective photoelectric conversion units, for example, in such a manner that the voltage of a forward bias is applied to the photoelectric conversion unit which is operated, and the voltage of a reverse bias is applied to the photoelectric conversion unit which is not operated. The potential control unit 62 controls the potential application unit 61, and applies the determined electric potential to each of the photoelectric conversion units. In other words, the potential control unit 62 applies a higher electric potential than the electric potential applied to the first section 37 to the second section 38 in the photoelectric conversion unit which is operated. The potential control unit 62 applies a lower electric potential than the electric potential applied to the first section 37 to the second section 38 in the photoelectric conversion unit which is not operated.

For example, the potential control unit 62 applies a higher electric potential than the electric potential applied to the first sections 37 of the photoelectric conversion units 23 and 25 to the second sections 38 of the photoelectric conversion units 23 and 25 in a case of applying a lower electric potential than the electric potential applied to the first section 37 of the photoelectric conversion unit 24 to the second section 38 of the photoelectric conversion unit 24. In this case, the photoelectric conversion unit 24 is operated, and the photoelectric conversion units 23 and 25 are not operated. Therefore, the electron is emitted from the meta-surface 22 only in a case where the electromagnetic wave in the wavelength region corresponding to the photoelectric conversion unit 24 enters the photoelectric conversion device 2.

Next, the electromagnetic wave enters the meta-surface 22 (process S5). For example, the electromagnetic wave passing through the window unit 11*a* of the housing 10 enters the meta-surface 22. For example, the electromagnetic wave to be measured enters the meta-surface 22. Thus, the electron is emitted from at least one photoelectric conversion unit corresponding to the wavelength region of the electromagnetic wave to be measured among the plurality of photoelectric conversion units 23, 24 and 25. The window unit 11*a* is configured to transmit the electromagnetic wave to be measured.

Next, the electromagnetic wave is detected in response to the electron emitted from the meta-surface 22 (process S6). The electromagnetic wave detection device 1 detects the electromagnetic wave in a state where the electric potentials determined in the process S4 are applied to each of the photoelectric conversion units. For example, the electromagnetic wave detection device 1 multiplies the electron emitted from the electron emitter 20 and detects the multiplied electron. Thus, the electromagnetic wave detection device 1 detects the electromagnetic wave entered from the window unit 11*a* of the housing 10.

Next, whether or not the process of detecting the electromagnetic wave in the current operating state is finished is determined (process S7). In other words, it is determined whether or not the process of detecting the electromagnetic wave in the operating state of the photoelectric conversion unit determined in the process S3 is finished. In a case where it is determined that the detection process is not finished, the process goes to the process S5. In a case where it is determined that the detection process is finished, the process goes to a process S8. The determination in the process S7 may be performed, for example, by the potential control unit 62, or may be performed by the other control unit in the electromagnetic wave detection device 1.

Next, it is determined whether or not all the detection of the range of wavelength determined in the process S2 is finished (process S8). For example, it is determined whether or not the potential control unit 62 operates all the photoelectric conversion units having the sensitivity in the range of wavelength determined in the process S2. In a case where it is determined that all the photoelectric conversion units having the sensitivity in the range of wavelength determined in the process S2 are operated, it is determined that the detection of the range of wavelength determined in the process S2 is finished. The determination in the process S8 may be performed by the other control unit in the electromagnetic wave detection device 1.

In a case where it is determined in the process S8 that all the detection of the range of wavelength is not finished, the process goes to a process S9. In this case, the photoelectric conversion unit to be operated is changed (process S9). For example, the potential control unit 62 changed the photoelectric conversion unit to be operated on the basis of the range of wavelength determined in the process S3. For example, the potential control unit 62 determines the photoelectric conversion unit which has been not operated as the photoelectric conversion unit to be operated, among the photoelectric conversion units having the sensitivity in the range of wavelength determined in the process S2. When the photoelectric conversion unit to be operated is changed in the process S9, the process goes to the process S4.

For example, the potential control unit 62 switches a state from a state where the photoelectric conversion unit 24 is operated and the photoelectric conversion units 23 and 25 are not operated, to a state where the photoelectric conversion unit 25 is operated and the photoelectric conversion units 23 and 24 are not operated. In this case, a lower electric potential than the electric potential applied to the first section 37 of the photoelectric conversion unit 25 is applied to the second section 38 of the photoelectric conversion unit 25, and a higher electric potential than the electric potential applied to the first sections 37 of the photoelectric conversion units 23 and 24 is applied to the second sections 38 of the photoelectric conversion units 23 and 24. Therefore, the state is switched from a state where the electron is emitted from the meta-surface 22 only in a case where the electromagnetic wave in the wavelength region corresponding to the photoelectric conversion unit 24 enters the photoelectric conversion device 2, to a state where the electron is emitted from the meta-surface 22 only in a case where the electromagnetic wave in the wavelength region corresponding to the photoelectric conversion unit 25 enters the photoelectric conversion device 2.

In a case where it is determined in the process S8 that the detection of all the range of wavelength is finished, a series of processes in the electromagnetic wave detection method are finished. As mentioned above, in the electromagnetic wave detection method illustrated in FIG. 5, the detection every wavelength region in the range of wavelength to be detected is executed by switching the photoelectric conversion unit to be operated and repeating the processes S4 to S7. The order of the photoelectric conversion unit to be operated may be determined in the process S3.

In the present embodiment, for example, in a case where the photoelectric conversion unit 23 is determined as the photoelectric conversion unit which is operated, and the photoelectric conversion units 24 and 25 are determined as the photoelectric conversion unit which is not operated, among the plurality of photoelectric conversion units 23, 24 and 25, in the process S3, electric potentials of the forward bias are applied to the photoelectric conversion unit 23, and electric potentials of the reverse bias are applied to the photoelectric conversion units 24 and 25. Thereafter, in a case where the photoelectric conversion unit 24 is determined as the photoelectric conversion unit which is operated, and the photoelectric conversion units 23 and 25 are determined as the photoelectric conversion unit which is not operated, among the plurality of photoelectric conversion units 23, 24 and 25, in the process S9, electric potentials of the forward bias are applied to the photoelectric conversion unit 24, and electric potentials of the reverse bias are applied to the photoelectric conversion units 23 and 25.

Figure 6:
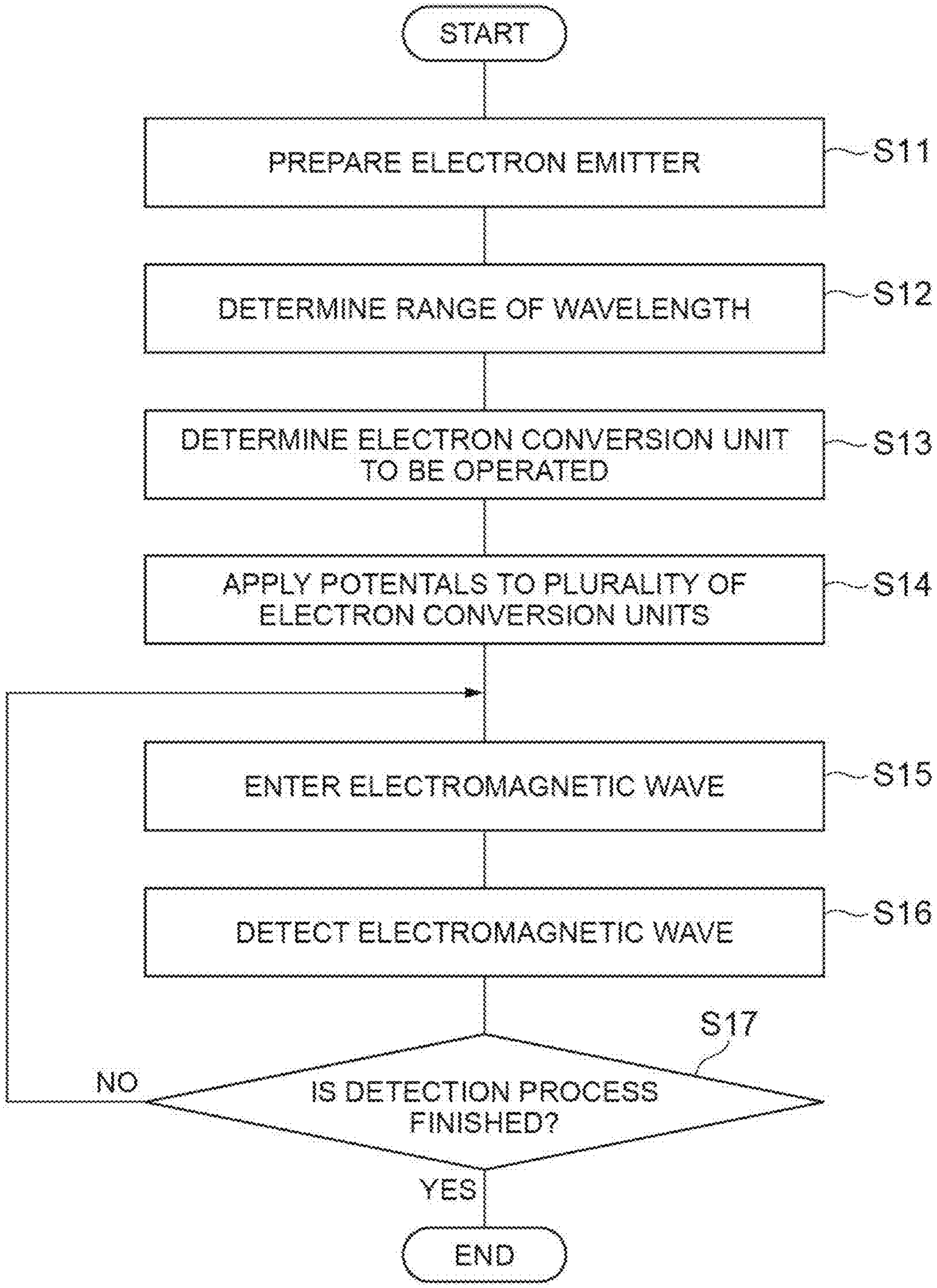
FIG. 6 is a flow chart of an electromagnetic wave detection method according to a modification of the first embodiment.

Next, a photoelectric conversion method according to a modification of the present embodiment will be described with reference to FIG. 6. Different portions from the example illustrated in FIG. 5 will be mainly described, and overlapping portions will be partly omitted. FIG. 6 is a flow chart of the electromagnetic wave detection method according to the present embodiment. In the electromagnetic wave detection method illustrated in FIG. 6, a range of wavelength to be detected is determined, and whether or not an electromagnetic wave having a wavelength component in the determined range of wavelength exists is detected. The range of wavelength to be detected may be a plurality of wavelength regions separated from each other. In the example illustrated in FIG. 6, the detection of the electromagnetic waves is performed in a state where the plurality of photoelectric conversion units corresponding to the determined range of wavelength are simultaneously operated. In the electromagnetic wave detection method illustrated in FIG. 6, the electromagnetic waves having the wavelength components in the plurality of wavelength regions are simultaneously detected.

First, the electron emitter 20 is prepared (process S11). For example, the electromagnetic wave detection device 1 with the electron emitter 20 is disposed.

Next, the range of wavelength is determined (process S12). For example, the potential control unit 62 acquires various information from an outer portion and determines the range of wavelength of the electromagnetic wave to be detected, based on the information. The various information may be input by a user, or may be acquired automatically via a communication. The potential control unit 62 may determine the range of wavelength of the electromagnetic wave to be detected, based on previously stored various information.

Next, the photoelectric conversion unit to be operated is determined (process S13). The potential control unit 62 determines the photoelectric conversion unit to be operated, for example, based on the range of wavelength determined in the process S12. The potential control unit 62 determines, for example, the plurality of photoelectric conversion units having the sensitivity in the range of wavelength determined in the process S12, as the photoelectric conversion unit to be operated. For example, the potential control unit 62 operates all the photoelectric conversion units having the sensitivity in the range of wavelength determined in the process S12. The potential control unit 62 determines, for example, all the photoelectric conversion units corresponding to the range of wavelength determined in the process S12, as the photoelectric conversion unit to be operated.

Next, the electric potential is applied to the plurality of photoelectric conversion units (process S14). The potential control unit 62 determines electric potentials applied to the respective electrodes 51, 52, 53 and 54, for example, based on the photoelectric conversion unit to be operated. For example, the potential control unit 62 acquires the information associated with the photoelectric conversion unit to be operated, with reference to a previously stored table. The potential control unit 62 determines electric potentials applied to the respective electrodes 51, 52, 53 and 54 on the basis of the acquired information.

The potential control unit 62 applies a lower electric potential than the electric potential applied to the first section 37 to the second section 38, in at least two photoelectric conversion units among the plurality of photoelectric conversion units. For example, the potential control unit 62 applies a lower electric potential than the electric potential applied to the first section 37 to the second section 38 in each of the plurality of photoelectric conversion units determined in the process S13. In other words, for example, the potential control unit 62 applies the voltage of the forward bias to all the photoelectric conversion units corresponding to the range of wavelength determined in the process S12. For example, the potential control unit 62 applies the voltage of the reverse bias to all the photoelectric conversion units which do not correspond to the range of wavelength determined in the process S12.

For example, the potential control unit 62 applies a lower electric potential than the electric potential applied to the first section 37 to the second section 38 in each of the photoelectric conversion units 23, 24 and 25. In this case, all the photoelectric conversion units 23, 24 and 25 are operated. Therefore, in a case where the electromagnetic wave in the wavelength region corresponding to any of the photoelectric conversion units 23, 24 and 25 enters the photoelectric conversion device 2, the electron is emitted from the meta-surface 22.

Next, the electromagnetic wave enters the meta-surface 22 (process S15). For example, the electromagnetic wave passing through the window unit 11*a* of the housing 10 enters the meta-surface 22. Next, the electromagnetic wave is detected depending on the electron emitted from the meta-surface 22 (process S16). The electromagnetic wave detection device 1 detects the electromagnetic wave in a state where the electric potentials determined in the process S14 are applied to each of the photoelectric conversion units. For example, the electromagnetic wave detection device 1 multiplies the electron emitted from the electron emitter 20, and detects the multiplied electron. As a result, the electromagnetic wave detection device 1 detects the electromagnetic wave entered from the window unit 11*a* of the housing 10.

Next, whether or not the detection process is finished is determined (process S17). In a case where it is determined that the detection process is not finished, the process goes to the process S15. In a case where it is determined that the detection process is finished, a series of processes in the electromagnetic wave detection method are finished. As mentioned above, in the electromagnetic wave detection method illustrated in FIG. 6, the photoelectric conversion units corresponding to the range of wavelength to be detected are simultaneously operated, and whether or not the electromagnetic wave in the range of wavelength to be detected exists is detected at one time.

Second Embodiment

Next, a configuration of an electromagnetic wave detection device according to a second embodiment will be described with reference to FIG. 7. The present embodiment is approximately similar or identical to the embodiment and the modification mentioned above. The second embodiment is different from the first embodiment and the modification mentioned above in a configuration of a photoelectric conversion unit and a method of applying an electric potential to an electron conversion unit. Hereinafter, different points from the first embodiment mentioned above will be mainly described. A meta-surface according to the second embodiment is also of the same active type as the meta-surface 22 according to the first embodiment.

Figure 7:
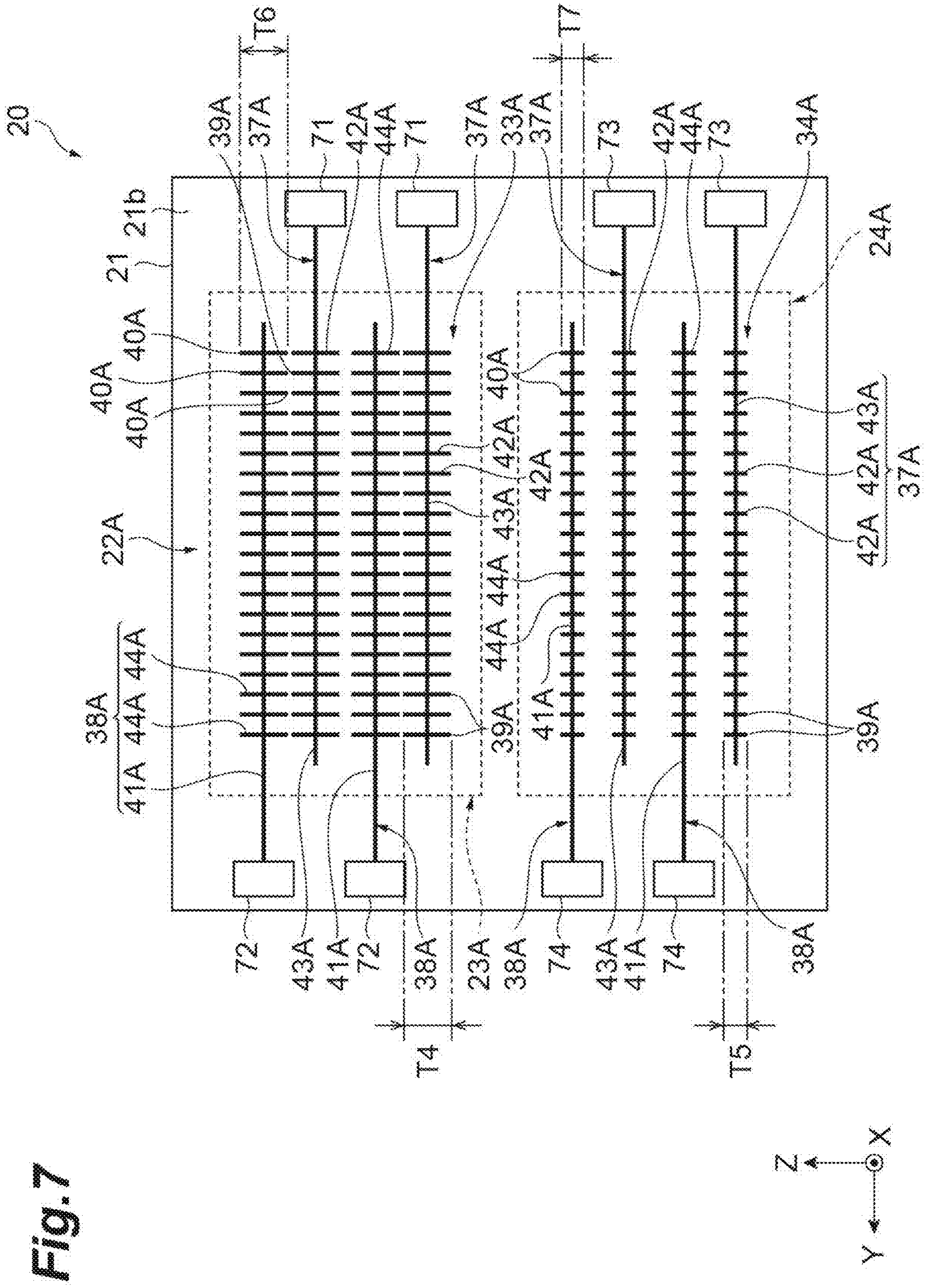
FIG. 7 is a plan view of an electron emitter according to the second embodiment.

FIG. 7 is a plan view of an electron emitter according to the second embodiment. The electron emitter 20 according to the present embodiment has a meta-surface 22A. The meta-surface 22A is of an active type and is operated by application of bias voltage. The meta-surface 22A is operated by application of electric potentials by means of a power supply unit 60. In the example illustrated in FIG. 7, the meta-surface 22A includes two photoelectric conversion units 23A and 24A. The photoelectric conversion unit 23A and the photoelectric conversion unit 24A correspond to electromagnetic waves having mutually different wavelength regions. In other words, the plurality of photoelectric conversion units 23A and 24A have sensitivity for the electromagnetic waves having mutually different wavelength regions.

The plurality of photoelectric conversion units 23A and 24A in the meta-surface 22A respectively include patterns having mutually different configurations. Each of the patterns is arranged on a principal surface 21*b* of a supporting body 21. The respective patterns have mutually different shapes. The photoelectric conversion units 23A and 24A respectively include patterns 33A and 34A having mutually different shapes. The photoelectric conversion unit 23A includes the pattern 33A, and the photoelectric conversion unit 24A includes the pattern 34A. Each of the patterns 33A and 34A is a conductive line and conducts an electron. Each of the patterns 33A and 34A includes a metal layer at least formed on an oxide layer of the meta-surface 22. A material of the metal layer includes, for example, gold.

Each of the patterns 33A and 34A includes a plurality of first sections 37A and a plurality of second sections 38A. In the present modification, each of the patterns 33A and 34A includes two first sections 37A and two second sections 38A. In each of the patterns 33A and 34A, the first section 37A and the second section 38A are disposed alternately in a direction of Z-axis. Each of the first sections 37A of the patterns 33A and 34A includes a leading end 39A. Each of the second sections 38A of the patterns 33A and 34A includes a leading end 40A. In the first section 37A and the second section 38A adjacent to each other, the leading end 39A and the leading end 40A face each other in the direction of Z-axis. In each of the patterns 33A and 34A, the first section 37A and the second section 38A are connected via the oxide layer. In each of the patterns 33A and 34A, the first section 37A and the second section 38A are separated by the oxide layer, and are insulated from each other at least when the photoelectric conversion device 2 is not operated.

The first section 37A emits the electron in response to incidence of the electromagnetic wave in a state where a lower electric potential than the electric potential of the second section 38A is applied to the first section 37A. In the same manner, the second section 38A emits the electron in response to incidence of the electromagnetic wave in a state where a lower electric potential than the electric potential of the first section 37A is applied to the second section 38A. Therefore, each of the photoelectric conversion units 23A and 24A can emit the electron from any of the first section 37A and the second section 38A depending on the state of the electric potentials.

In the example illustrated in FIG. 7, each of the second sections 38A in each of the patterns 33A and 34A includes a plurality of linear parts 44A extending in a direction of Z-axis and a linear part 41A extending in a direction of Y-axis and connecting the plurality of linear parts 44A. The plurality of linear parts 44A extend from the linear part 41A toward the corresponding first section 37A. Each of the linear parts 44A extends from the linear part 41A toward a direction of +Z-axis and a direction of −Z-axis. Each of the linear parts 44A is formed, for example, into a linear shape. The plurality of linear parts 44A are, for example, in parallel to each other. The linear part 41A is formed, for example, into a linear shape. Each of the linear parts 44A is connected to the linear part 41A at the center thereof.

Each of the first sections 37A in each of the patterns 33A and 34A includes a plurality of linear parts 42A extending in a direction of Z-axis and a linear part 43A extending in a direction of Y-axis and connecting the plurality of linear parts 42A. The plurality of linear parts 42A extend from the linear part 43A toward the corresponding second section 38A. Each of the linear parts 42A extends from the linear part 43A toward a direction of +Z-axis and a direction of −Z-axis. Each of the linear parts 42A is formed, for example, into a linear shape. The plurality of linear parts 42A are, for example, in parallel to each other. The linear part 43A is formed, for example, into a linear shape. Each of the linear parts 42A is connected to the linear part 43A at the center thereof. The linear part 41A and the linear part 43A in each of the patterns 33A and 34A are, for example, in parallel to each other.

In the example illustrated in FIG. 7, each of the linear parts 42A includes a pair of leading ends 39A. Each of the leading ends 39A is spaced away from the other linear part 42A and linear part 43A in the same pattern and from the other pattern. Each of the linear parts 44A includes a pair of leading ends 40A. Each of the leading ends 40A is spaced away from the other linear part 44A and linear part 41A in the same pattern and from the other pattern. The leading end 39A and the leading end 40A opposing to each other face each other. The shortest distance between the leading end 40A and the leading end 39A facing each other is smaller than the shortest distance between the other positions than the leading end 39A in the first section 37A and each of the leading ends 40A. The shortest distance between the leading end 39A and the leading end 40A facing each other is smaller than the shortest distance between the other positions than the leading end 40A in the second section 38A and each of the leading ends 39A. In other words, the leading end 39A is a portion which is closest to the corresponding linear part 44A in the linear part 42A including the leading end 39A. The leading end 40A is a portion which is closest to the corresponding linear part 42A in the linear part 44A including the leading end 40A. The leading end 39A is disposed closer to the linear part 42A than the other portions of the pattern including the leading end 39A. The leading end 40A is disposed closer to the linear part 42A than the other portions of the pattern including the leading end 40A.

In each of the photoelectric conversion units 23A and 24A, the linear part 44A of the second section 38A emits the electron in response to incidence of the electromagnetic wave in a state where a lower electric potential than the electric potential of the linear part 42A of the first section 37A is applied thereto. In this case, the linear part 42A configures a bias portion and the linear part 44A configures an antenna portion. In each of the photoelectric conversion units 23A and 24A, the linear part 42A of the first section 37A emits the electron in response to incidence of the electromagnetic wave in a state where a lower electric potential than the electric potential of the linear part 44A of the second section 38A is applied thereto. In this case, the linear part 44A configures a bias portion and the linear part 42A configures an antenna portion. In other words, in each of the photoelectric conversion units 23A and 24A, at least one of the first section 37A and the second section 38A can act as both the antenna portion and the bias portion.

The linear parts 42A of the plurality of patterns 33A and 34A have mutually different lengths T4 and T5. In other words, the linear part 42A of the photoelectric conversion unit 23A and the linear part 42A of the photoelectric conversion unit 24A have mutually different lengths T4 and T5. The lengths T4 and T5 of the linear parts 42A in the respective patterns 33A and 34A are equal to a length in a direction of Z-axis from one leading end 39A to the other leading end 39A of each of the linear parts 42A.

The linear parts 44A of the plurality of patterns 33A and 34A have mutually different lengths T6 and T7. In other words, the linear part 44A of the photoelectric conversion unit 23A and the linear part 44A of the photoelectric conversion unit 24A have mutually different lengths T6 and T7. The lengths T6 and T7 of the linear parts 44A in the respective patterns 33A and 34A are equal to a length in a direction of Z-axis from one leading end 40A to the other leading end 40A of each of the linear parts 44A.

In the pattern 33A, the lengths T4 of the plurality of linear parts 42A are the same. In the pattern 34A, the lengths T5 of the plurality of linear parts 42A are the same. In the pattern 33A, the lengths T6 of the plurality of linear parts 44A are the same. In the pattern 34A, the lengths T7 of the plurality of linear parts 44A are the same. The lengths T4 and T5 of the linear parts 42A in the respective patterns 33A and 34A correspond to the wavelength regions of the electromagnetic wave which allow the electron to be emitted from the photoelectric conversion units 23A and 24A in a state where a lower electric potential than the electric potential of the linear part 44A is applied to the linear part 42A. The lengths T6 and T7 of the linear parts 44A in the respective patterns 33A and 34A correspond to the wavelength regions of the electromagnetic wave which allow the electron to be emitted from the photoelectric conversion units 23A and 24A in a state where a lower electric potential than the electric potential of the linear part 42A is applied to the linear part 44A. For example, each of the lengths T4 and T5 or each of the lengths T6 and T7 is a length which is half the length of a center wavelength of a desired wavelength region. As mentioned above, in a case where the electromagnetic wave passing through the supporting body 21 enters the linear part 42, a refractive index of the supporting body 21 through which the electromagnetic wave passes is taken into consideration.

In an example illustrated in FIG. 7, the electron emitter 20 is further provided with a plurality of electrodes 71, 72, 73 and 74 which are spaced away from each other. The plurality of electrodes 71, 72, 73 and 74 are electrically connected to at least one of the plurality of photoelectric conversion units 23A and 24A. In the example illustrated in FIG. 7, the electron emitter 20 is provided with two electrodes 71, two electrodes 72, two electrodes 73 and two electrodes 74. In the example illustrated in FIG. 7, each of the electrodes 71, 72, 73 and 74 is formed into a rectangular shape. As a modification, each of the electrodes 71, 72, 73 and 74 may be formed into a linear shape in the same manner as the first section 37A or the second section 38A. Each of the electrodes 71, 72, 73 and 74 may be integrally formed with the first section 37A or the second section 38A.

For example, each of the electrodes 71 is electrically connected to one first section 37A of the photoelectric conversion unit 23A. Each of the electrodes 72 is electrically connected to one second section 38A of the photoelectric conversion unit 23A. Each of the electrodes 73 is electrically connected to one first section 37A of the photoelectric conversion unit 24A. Each of the electrodes 74 is electrically connected to one second section 38A of the photoelectric conversion unit 24A.

In the example illustrated in FIG. 7, each of the photoelectric conversion units 23A and 24A is operated by application of electric potentials from the power supply unit 60 via the plurality of electrodes 71, 72, 73 and 74. The potential application unit 61 of the power supply unit 60 applies electric potentials to each of the photoelectric conversion units 23A and 24A via the plurality of electrodes 71, 72, 73 and 74. The potential control unit 62 of the power supply unit 60 controls electric potentials applied to the respective photoelectric conversion units 23A and 24A.

In the electromagnetic wave detection method using the electron emitter according to the second embodiment, for example, a process except the process S12 and the process S13 among the electromagnetic wave detection method illustrated in FIG. 6 is executed. In this case, a process S14 is executed as a photoelectric conversion unit operating both the photoelectric conversion unit 23A and the photoelectric conversion unit 24.

In each of the patterns 33A, in a case where the length of each of the linear parts 44A and the length of each of the linear parts 42A are configured to be different from each other, the process S12 is executed, and electric potentials applied to the electrode 71 and the electrode 72 may be changed depending on the determined range of the wavelength.

In the same manner, in each of the patterns 34A, in a case where the length of each of the linear parts 44A and the length of each of the linear parts 42A are configured to be different from each other, the process S12 is executed, and electric potentials applied to the electrode 73 and the electrode 74 may be changed depending on the determined range of wavelength.

Figure 8:
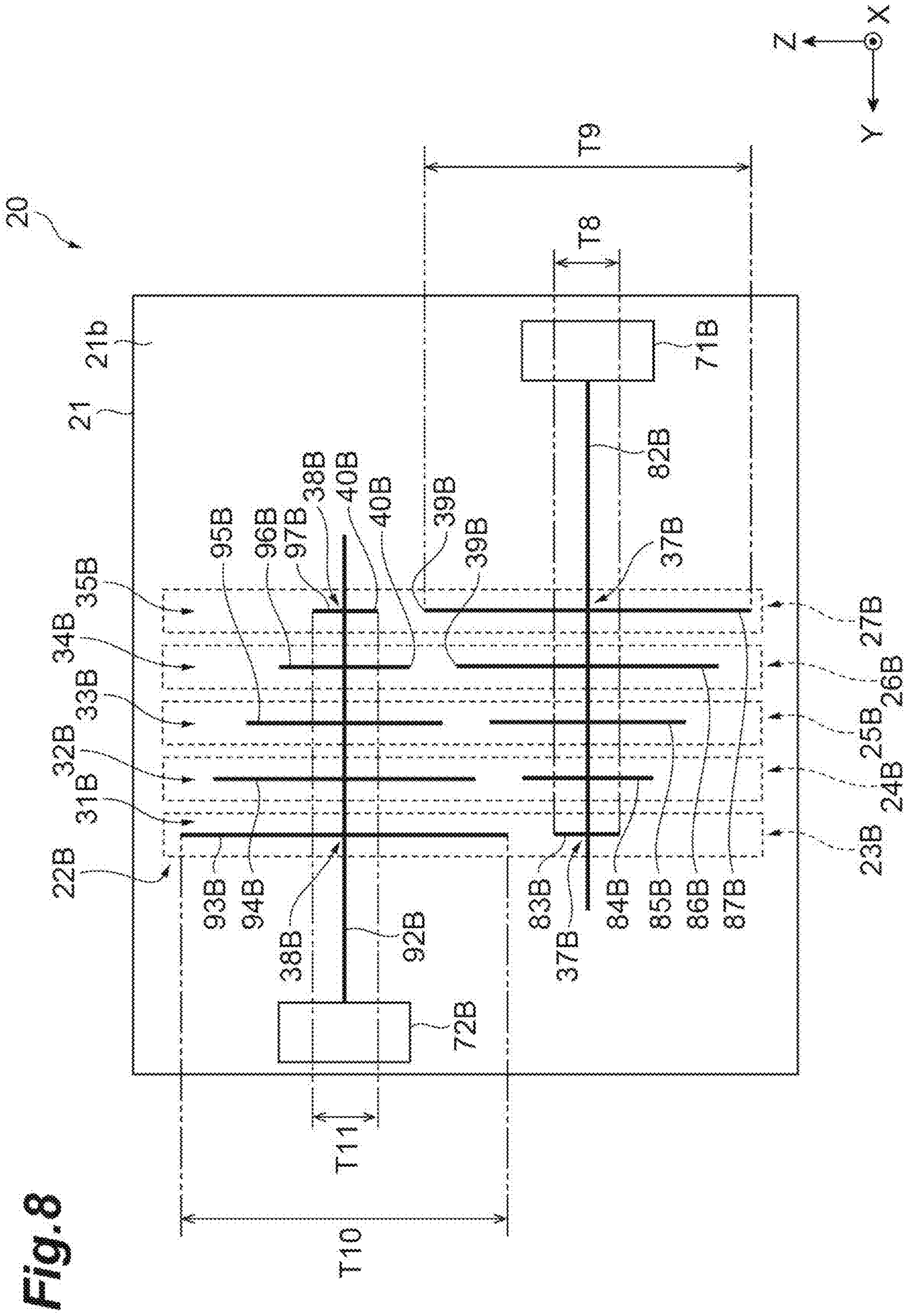
FIG. 8 is a plan view of an electron emitter according to a modification of the second embodiment.

Next, a configuration of a modification of the second embodiment will be described with reference to FIG. 8. FIG. 8 is a plan view of an electron emitter according to a modification of the second embodiment. In this modification, an electron emitter 20 has a meta-surface 22B. The meta-surface 22B is of an active type and is operated by application of bias voltage.

The meta-surface 22B is operated by application of electric potentials by means of the power supply unit 60. In the example illustrated in FIG. 8, the meta-surface 22B includes a plurality of photoelectric conversion units 23B, 24B, 25B, 26B and 27B. Each of the plurality of photoelectric conversion units 23B, 24B, 25B, 26B and 27B correspond to the electromagnetic waves having mutually different wavelength regions. In other words, the plurality of photoelectric conversion units 23B, 24B, 25B, 26B and 27B have the sensitivity for the electromagnetic waves having mutually different wavelength regions. The photoelectric conversion units 23B, 24B, 25B, 26B and 27B are arranged in a direction of Y-axis. The photoelectric conversion units 23B, 24B, 25B, 26B and 27B are disposed in the order of the photoelectric conversion units 27B, 26B, 25B, 24B and 23B in a direction of +Y-axis.

The plurality of photoelectric conversion units 23B, 24B, 25B, 26B and 27B in the meta-surface 22B respectively includes patterns having mutually different configurations. Each of the patterns is disposed on the principal surface 21*b* of the supporting body 21. The patterns have mutually different shapes. The photoelectric conversion unit 23B include a pattern 31B, the photoelectric conversion unit 24B includes a pattern 32B, the photoelectric conversion unit 25B includes a pattern 33B, the photoelectric conversion unit 26B includes a pattern 34B, and the photoelectric conversion unit 27B includes a pattern 35B. Each of the patterns 31B, 32B, 33B, 34B and 35B is a conductive line, and conducts the electron. Each of the patterns 31B, 32B, 33B, 34B and 35B includes at least a metal layer formed on an oxide layer of the meta-surface 22. The material of the metal layer includes, for example, gold.

Each of the patterns 31B, 32B, 33B, 34B and 35B includes a first section 37B and a second section 38B. In the present modification, each of the patterns 31B, 32B, 33B, 34B and 35B includes one first section 37B and one second section 38B. Each of the first sections 37B of the patterns 31B, 32B, 33B, 34B and 35B includes a leading end 39B. Each of the second sections 38B of the patterns 31B, 32B, 33B, 34B and 35B includes a leading end 40B. In the first section 37B and the second section 38B adjacent to each other, the leading end 39B and the leading end 40B face each other in the direction of Z-axis. In each of the patterns 31B, 32B, 33B, 34B and 35B, the first section 37B and the second section 38B are connected via the oxide layer. In each of the patterns 31B, 32B, 33B, 34B and 35B, the first section 37B and the second section 38B are separated by the oxide layer, and are insulated from each other at least when the photoelectric conversion device 2 is not operated.

The first section 37B emits the electron in response to incidence of the electromagnetic wave in a state where a lower electric potential than the electric potential of the second section 38B is applied thereto. In the same manner, the second section 38B emits the electron in response to incidence of the electromagnetic wave in a state where a lower electric potential than the electric potential of the first section 37B is applied thereto. Therefore, each of the photoelectric conversion units 23B, 24B, 25B, 26B and 27B can emit the electron from any of the first section 37B and the second section 38B depending on the state of electric potential.

In the example illustrated in FIG. 8, the first sections 37B of the patterns 31B, 32B, 33B, 34B and 35B respectively include linear parts 83B, 84B, 85B, 86B and 87B extending in the direction of Z-axis, and a linear part 82B extending in the direction of Y-axis and connecting the plurality of linear parts 83B, 84B, 85B, 86B and 87B. In other words, the respective first sections 37B of the patterns 31B, 32B, 33B, 34B and 35B are connected to each other by one linear part 82B. The first section 37B of the pattern 31B includes the linear part 83B and the linear part 82B. The first section 37B of the pattern 32B includes the linear part 84B and the linear part 82B. The first section 37B of the pattern 33B includes the linear part 85B and the linear part 82B. The first section 37B of the pattern 34B includes the linear part 86B and the linear part 82B. The first section 37B of the pattern 35B includes the linear part 87B and the linear part 82B.

The plurality of linear parts 83B, 84B, 85B, 86B and 87B extend from the linear part 82B toward the corresponding second sections 38B. Each of the linear parts 83B, 84B, 85B, 86B and 87B extends in a direction of +Z-axis and a direction of −Z-axis from the linear part 82B. Each of the linear parts 83B, 84B, 85B, 86B and 87B is formed, for example, into a linear shape. For example, the plurality of linear parts 83B, 84B, 85B, 86B and 87B are in parallel to each other. The linear part 82B is formed, for example, into a linear shape. Each of the linear parts 83B, 84B, 85B, 86B and 87B is connected to the linear part 82B at the center thereof.

The second sections 38B of the patterns 31B, 32B, 33B, 34B and 35B respectively include linear parts 93B, 94B, 95B, 96B and 97B extending in the direction of Z-axis, and a linear part 92B extending in the direction of Y-axis and connecting the plurality of linear parts 93B, 94B, 95B, 96B and 97B. In other words, the respective second sections 38B of the linear parts 93B, 94B, 95B, 96B and 97B are connected to each other by one linear part 92B. The second section 38B of the pattern 31B includes the linear part 93B and the linear part 92B. The second section 38B of the pattern 32B includes the linear part 94B and the linear part 92B. The second section 38B of the pattern 33B includes the linear part 95B and the linear part 92B. The second section 38B of the pattern 34B includes the linear part 96B and the linear part 92B. The second section 38B of the pattern 35B includes the linear part 97B and the linear part 92B.

The plurality of linear parts 93B, 94B, 95B, 96B and 97B extend from the linear part 92B toward the corresponding first sections 37B. The respective linear parts 93B, 94B, 95B, 96B and 97B extend in the direction of +Z-axis and the direction of −Z-axis from the linear part 92B. Each of the linear parts 93B, 94B, 95B, 96B and 97B is formed, for example, into a linear shape. For example, the plurality of linear parts 93B, 94B, 95B, 96B and 97B are in parallel to each other. The linear part 92B is formed, for example, into a linear shape. Each of the linear parts 93B, 94B, 95B, 96B and 97B is connected to the linear part 92B at the center thereof. For example, the linear part 82B of each of the patterns 31B, 32B, 33B, 34B and 35B and the linear part 92B are in parallel to each other.

In the example illustrated in FIG. 8, each of the linear parts 83B, 84B, 85B, 86B and 87B includes a pair of leading ends 39B. Each of the leading ends 39B is spaced away from the other linear part of the same pattern and from the other patterns. Each of the linear parts 93B, 94B, 95B, 96B and 97B includes a pair of leading ends 40B. Each of the leading ends 40B is spaced away from the other linear part of the same pattern and from the other patterns. The leading end 39B and the leading end 40B opposing to each other face each other. The shortest distance between the leading end 39B and the leading end 40B facing each other is smaller than the shortest distance between the other positions than the leading end 39B in the first section 37B and each of the leading ends 40B. The shortest distance between the leading end 39B and the leading end 40B facing each other is smaller than the shortest distance between the other positions than the leading end 40B in the second section 38B and each of the leading ends 39B. In other words, the leading end 40B is a portion which is the closest to the corresponding linear parts 83B, 84B, 85B, 86B and 87B in the linear parts 93B, 94B, 95B, 96B and 97B including the leading end 40B. The leading end 39B is a portion which is the closest to the corresponding linear parts 93B, 94B, 95B, 96B and 97B in the linear parts 83B, 84B, 85B, 86B and 87B including the leading end 39B. The leading end 39B is disposed closer to the linear parts 93B, 94B, 95B, 96B and 97B than the other portions of the pattern including the leading end 39B. The leading end 40B is disposed closer to the linear parts 83B, 84B, 85B, 86B and 87B than the other portions of the pattern including the leading end 40B.

The shortest distance between the linear parts 83B, 84B, 85B, 86B and 87B and the linear parts 93B, 94B, 95B, 96B and 97B facing each other in the direction of Z-axis is constant. For example, the shortest distance between the linear part 83B and the linear part 93B included in the photoelectric conversion unit 23B is the same as the shortest distance between the linear part 84B and the linear part 94B included in the photoelectric conversion unit 24B.

In the respective photoelectric conversion units 23B, 24B, 25B, 26B and 27B, each of the linear parts 83B, 84B, 85B, 86B and 87B of the first section 37B emits the electron in response to incidence of the electromagnetic wave in a state where a lower electric potential than the electric potential of the linear parts 93B, 94B, 95B, 96B and 97B of the second section 38B is applied thereto. In this case, the linear parts 93B, 94B, 95B, 96B and 97B configure a bias portion, and the linear parts 83B, 84B, 85B, 86B and 87B configure an antenna portion. In the respective photoelectric conversion units 23B, 24B, 25B, 26B and 27B, each of the linear parts 93B, 94B, 95B, 96B and 97B of the second section 38B emit the electron in response to incidence of the electromagnetic wave in a state where a lower electric potential than the electric potential of the linear parts 83B, 84B, 85B, 86B and 87B of the first section 37B is applied thereto. In this case, the linear parts 83B, 84B, 85B, 86B and 87B configure the bias portion, and the linear parts 93B, 94B, 95B, 96B and 97B configure the antenna portion. In other words, in each of the photoelectric conversion units 23B, 24B, 25B, 26B and 27B, at least one of the first section 37B and the second section 38B can act as both the antenna portion and the bias portion.

The linear parts 83B, 84B, 85B, 86B and 87B of the plurality of patterns 31B, 32B, 33B, 34B and 35B have mutually different lengths. For example, a length T8 of the linear part 83B of the pattern 31B and a length T9 of the linear part 87B of the pattern 35B are different from each other. The lengths of the linear parts 83B, 84B, 85B, 86B and 87B in the respective patterns 31B, 32B, 33B, 34B and 35B are a length in a direction of Z-axis from one leading end 39B to the other leading end 39B in each of the linear parts 83B, 84B, 85B, 86B and 87B. For example, the length T8 is smaller than the length T9.

In the present embodiment, the length of the linear part 86B is smaller than the length of the linear part 87B. The length of the linear part 85B is smaller than the length of the linear part 86B. The length of the linear part 84B is smaller than the length of the linear part 85B. The length of the linear part 83B is smaller than the length of the linear part 84B. In other words, the linear parts 87B, 86B, 85B, 84B and 83B are configured to be shorter toward the direction of +Y-axis.

The linear parts 93B, 94B, 95B, 96B and 97B of the plurality of patterns 31B, 32B, 33B, 34B and 35B have mutually different length. For example, a length T10 of the linear part 93B of the pattern 31B and a length T11 of the linear part 97B of the pattern 35B are different from each other. The lengths of the linear parts 93B, 94B 95B, 96B and 97B in the respective patterns 31B, 32B, 33B, 34B and 35B is a length in a direction of Z-axis from one leading end 40B to the other leading end 40B of each of the linear parts 93B, 94B, 95B, 96B and 97B. For example, the length T10 is greater than the length T11.

In the present embodiment, the length of the linear part 96B is greater than the length of the linear part 97B. The length of the linear part 95B is greater than the length of the linear part 96B. The length of the linear part 94B is greater than the length of the linear part 95B. The length of the linear part 93B is greater than the length of the linear part 94B. In other words, the linear parts 97B, 96B, 95B, 94B and 93B are configured to be longer toward the direction of +Y-axis.

The lengths of the linear parts 83B, 84B, 85B, 86B and 87B correspond to the wavelength regions of the electromagnetic wave which allow the electron to be emitted from the respective photoelectric conversion units 23B, 24B, 25B, 26B and 27B in a state where a lower electric potential than the electric potential of the linear parts 93B, 94B, 95B, 96B and 97B is applied to the linear parts 83B, 84B, 85B, 86B and 87B. The lengths of the linear parts 93B, 94B, 95B, 96B and 97B correspond to the wavelength regions of the electromagnetic wave which allow the electron to be emitted from the respective photoelectric conversion units 23B, 24B, 25B, 26B and 27B in a state where a lower electric potential than the electric potential of the linear parts 83B, 84B, 85B, 86B and 87B is applied to the linear parts 93B, 94B, 95B, 96B and 97B. For example, each of the lengths of the linear parts 83B, 84B, 85B, 86B and 87B or each of the lengths of the linear parts 93B, 94B, 95B, 96B and 97B is a length which is half the length of a center wavelength of a desired wavelength region. As mentioned above, in a case where the electromagnetic wave passing through the supporting body 21 enters the linear part 42, a refractive index of the transmitting supporting body 21 through which the electromagnetic wave passes is taken into consideration.

In the example illustrated in FIG. 8, the electron emitter 20 is further provided with a plurality of electrodes 71B and 72B which are spaced away from each other. In the example illustrated in FIG. 8, the electron emitter 20 is provided with one electrode 71B and one electrode 72B. In the example illustrated in FIG. 8, each of the electrodes 71B and 72B is formed into a rectangular shape. As a modification, each of the electrodes 71B and 72B may be formed into a linear shape in the same manner as the first section 37B or the second section 38B. Each of the electrodes 71B and 72B may be integrally formed with the first section 37B or the second section 38B.

For example, the electrode 71B is electrically connected to the first section 37B of each of the photoelectric conversion units 23B, 24B, 25B, 26B and 27B. The electrode 72B is electrically connected to the second section 38B of each of the photoelectric conversion units 23B, 24B, 25B, 26B and 27B. In the example illustrated in FIG. 8, each of the photoelectric conversion units 23B, 24B, 25B, 26B and 27B is operated by application of electric potentials from the power supply unit 60 via the plurality of electrodes 71B and 72B. The potential application unit 61 of the power supply unit 60 applies the electric potential to each of the photoelectric conversion units 23B, 24B, 25B, 26B and 27B via the plurality of electrodes 71B and 72B. The potential control unit 62 of the power supply unit 60 controls potentials applied to each of the first section 37B and the second section 38B.

In the example illustrated in FIG. 8, the linear parts 83B, 84B, 85B, 86B and 87B having mutually different lengths are connected to each other by the linear part 82B. As a result, in a state where a lower electric potential than the electric potential of the electrode 72B is applied to the electrode 71B, the electron is emitted from the linear parts 83B, 84B, 85B, 86B and 87B in response to incidence of the electromagnetic wave in the wavelength region corresponding to each of the linear parts 83B, 84B, 85B, 86B and 87B. In the example illustrated in FIG. 8, the linear parts 93B, 94B, 95B, 96B and 97B having mutually different lengths are connected to each other by the linear part 92B. As a result, in a state where a lower electric potential than the electric potential of the electrode 71B is applied to the electrode 72B, the electron is emitted from the linear parts 93B, 94B, 95B, 96B and 97B in response to incidence of the electromagnetic wave in the wavelength region corresponding to each of the linear parts 93B, 94B, 95B, 96B and 97B.

As mentioned above, in the example illustrated in FIG. 8, the linear parts 83B, 84B, 85B, 86B and 87B having mutually different lengths are connected by the same linear part 82B. The linear parts 93B, 94B, 95B, 96B and 97B having mutually different lengths are connected by the same linear part 92B. According to the configuration mentioned above, a range of wavelength of the electromagnetic wave convertible into the electron can be secured by a more compact configuration. In other words, the electromagnetic waves having mutually different wavelength components can be simultaneously detected in spite of the more compact configuration. Further, the shortest distance between the linear parts 83B, 84B, 85B, 86B and 87B and the linear parts 93B, 94B, 95B, 96B and 97B facing each other in the direction of Z-axis is constant. As a result, the sensitivity of the electromagnetic wave can be secured in each of the photoelectric conversion units 23B, 24B, 25B, 26B and 27B.

Figure 9:
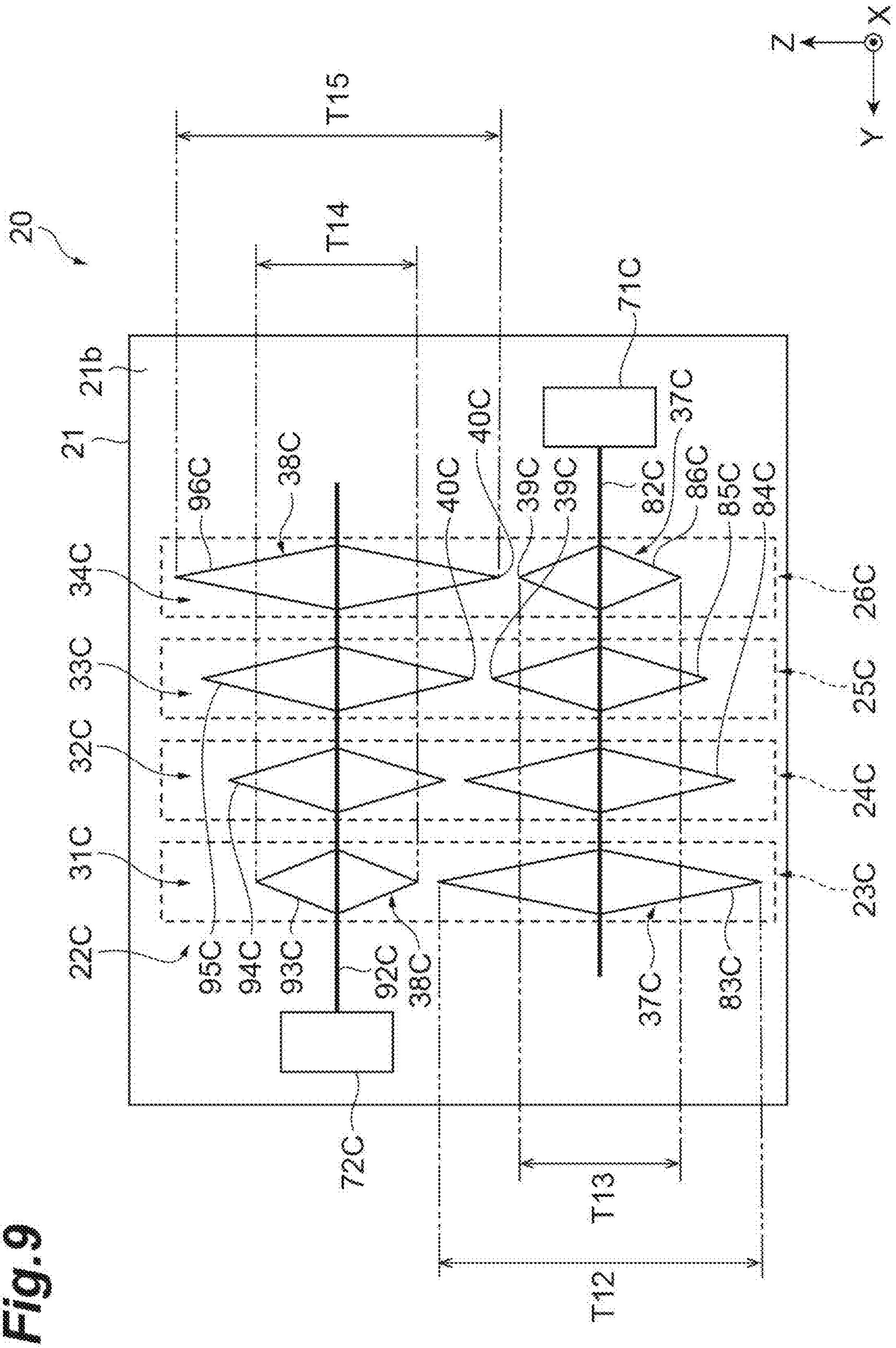
FIG. 9 is a plan view of an electron emitter according to a modification of the second embodiment.

Next, a configuration of further the other modification of the second embodiment will be described with reference to FIG. 9. FIG. 9 is a plan view of an electron emitter according to the modification of the second embodiment. In this modification, the electron emitter 20 has a meta-surface 22C. The meta-surface 22C is also of an active type, and is operated by application of bias voltage. The present modification is approximately similar to or the same as the example illustrated in FIG. 8. The antenna portion of the meta-surface 22B includes dipole antennas, but an antenna portion of the meta-surface 22C includes diamond antennas. Hereinafter, a different point between the modification illustrated in FIG. 8 and the modification illustrated in FIG. 9 will be mainly described.

In the example illustrated in FIG. 9, the meta-surface 22C includes a plurality of photoelectric conversion units 23C, 24C, 25C and 26C. The plurality of photoelectric conversion units 23C, 24C, 25C and 26C respectively correspond to the electromagnetic waves having mutually different wavelength regions. In other words, the plurality of photoelectric conversion units 23C, 24C, 25C and 26C have the sensitivity for the electromagnetic waves in the different wavelength regions from each other. The photoelectric conversion units 23C, 24C, 25C and 26C are disposed in the order of the photoelectric conversion units 26C, 25C, 24C and 23C in a direction of +Y-axis.

The photoelectric conversion unit 23C includes a pattern 31C, the photoelectric conversion unit 24C includes a pattern 32C, the photoelectric conversion unit 25C includes a pattern 33C, and the photoelectric conversion unit 26C includes a pattern 34C. Each of the patterns 31C, 32C, 33C and 34C corresponds to each of the patterns 31B, 32B, 33B and 34B and is configured by the same material as each of the patterns 31B, 32B, 33B and 34B.

Each of the patterns 31C, 32C, 33C and 34C includes a first section 37C and a second section 38C. Each of the first sections 37C of the patterns 31C, 32C, 33C and 34C includes a leading end 39C. Each of the second sections 38C of the patterns 31C, 32C, 33C and 34C includes a leading end 40C. Each of the first sections 37C corresponds to each of the first sections 37B, and each of the second sections 38C corresponds to each of the second sections 38B. The leading end 39C corresponds to the leading end 39B, and the leading end 40C corresponds to the leading end 40B.

In the example illustrated in FIG. 9, the first sections 37C of the patterns 31C, 32C, 33C and 34C respectively include rhombic parts 83C, 84C, 85C and 86C extending in a direction of Z-axis, and a linear part 82C extending in a direction of Y-axis and connecting the plurality of rhombic parts 83C, 84C, 85C and 86C. The linear part 82C corresponds to the linear part 82B. The rhombic parts 83C, 84C, 85C and 86C correspond to the linear parts 83B, 84B, 85B and 86B.

The plurality of rhombic parts 83C, 84C, 85C and 86C extend from the linear part 82C toward the corresponding second section 38C. Each of the rhombic parts 83C, 84C, 85C and 86C extends in a direction of +Z-axis and a direction of −Z-axis from the linear part 82C. Each of the rhombic parts 83C, 84C, 85C and 86C is connected to the linear part 82C at the center thereof. For example, the linear part 82C is connected to two apexes of each of the rhombic parts 83C, 84C, 85C and 86C.

In the example illustrated in FIG. 9, the second sections 38C of the patterns 31C, 32C, 33C and 34C respectively include rhombic parts 93C, 94C, 95C and 96C extending in a direction of Z-axis, and a linear part 92C extending in a direction of Y-axis and connecting the plurality of rhombic parts 93C, 94C, 95C and 96C. The linear part 92C corresponds to the linear part 92B. The rhombic parts 93C, 94C, 95C and 96C correspond to the linear parts 93B, 94B, 95B and 96B. The rhombic parts 93C, 94C, 95C and 96C are different from the linear parts 93B, 94B, 95B and 96B in a point that they are formed into a rhombic shape.

The plurality of rhombic parts 93C, 94C, 95C and 96C extend from the linear part 92C toward the corresponding first section 37C. Each of the rhombic parts 93C, 94C, 95C and 96C extends in a direction of +Z-axis and a direction of −Z-axis from the linear part 92C. Each of the rhombic parts 93C, 94C, 95C and 96C is connected to the linear part 92C at the center thereof. For example, the linear part 92C is connected to two apexes of each of the rhombic parts 93C, 94C, 95C and 96C.

In each of the photoelectric conversion units 23C, 24C, 25C and 26C, the rhombic parts 83C, 84C, 85C and 86C of the first section 37C emit the electron in response to incidence of the electromagnetic wave in a state where a lower electric potential than the electric potential of the rhombic parts 93C, 94C, 95C and 96C of the second section 38C is applied thereto. In this case, the rhombic parts 93C, 94C, 95C and 96C configure a bias portion, and the rhombic parts 83C, 84C, 85C and 86C configure an antenna portion. In this case, the rhombic parts 83C, 84C, 85C and 86C configure a bow-tie antenna.

In each of the photoelectric conversion units 23C, 24C, 25C and 26C, the rhombic parts 93C, 94C, 95C and 96C of the second section 38C emit the electron in response to incidence of the electromagnetic wave in a state where a lower electric potential than the electric potential of the rhombic parts 83C, 84C, 85C and 86C of the first section 37C is applied thereto. In this case, the rhombic parts 83C, 84C, 85C and 86C configure a bias portion, and the rhombic parts 93C, 94C, 95C and 96C configure an antenna portion. In this case, the rhombic parts 93C, 94C, 95C and 96C configure a bow-tie antenna. In other words, in each of the photoelectric conversion units 23C, 24C, 25C and 26C, at least one of the first section 37C and the second section 38C can act as both the antenna portion and the bias portion.

The rhombic parts 83C, 84C, 85C and 86C of the plurality of patterns 31C, 32C, 33C and 34C have mutually different lengths. For example, a length T12 of the rhombic part 83C of the pattern 31C and a length T13 of the rhombic part 86C of the pattern 34C are different from each other. The lengths of the rhombic parts 83C, 84C, 85C and 86C in the respective patterns 31C, 32C, 33C and 34C are a length in a direction of Z-axis from one leading end 39C to the other leading end 39C of each of the rhombic parts 83C, 84C, 85C and 86C. For example, the length T12 is greater than the length T13.

In the present embodiment, the length of the rhombic part 85C is greater than the length of the rhombic part 86C. The length of the rhombic part 84C is greater than the length of the rhombic part 85C. The length of the rhombic part 83C is greater than the length of the rhombic part 84C. In other words, the rhombic parts 86C, 85C, 84C and 83C are configured to be longer toward the direction of +Y-axis.

The rhombic parts 93C, 94C, 95C and 96C of the plurality of patterns 31C, 32C, 33C and 34C have mutually different lengths. For example, a length T14 of the rhombic part 93C of the pattern 31C and a length T15 of the rhombic part 96C of the pattern 34C are different from each other. The lengths of the rhombic parts 93C, 94C, 95C and 96C in the respective patterns 31C, 32C, 33C and 34C are a length in a direction of Z-axis from one leading end 40C to the other leading end 40C of each of the rhombic parts 93C, 94C, 95C and 96C.

In the present embodiment, the length of the rhombic part 95C is smaller than the length of the rhombic part 96C. The length of the rhombic part 94C is smaller than the length of the rhombic part 95C. The length of the rhombic part 93C is smaller than the length of the rhombic part 94C. In other words, the rhombic parts 96C, 95C, 94C and 93C are configured to be shorter toward the direction of +Y-axis.

In the example illustrated in FIG. 9, the electron emitter 20 is further provided with a plurality of electrodes 71C and 72C which are spaced away from each other. In the example illustrated in FIG. 9, the electrode 71C corresponds to the electrode 71B, and the electrode 72C corresponds to the electrode 72B.

As mentioned above, in the example illustrated in FIG. 9, the rhombic parts 83C, 84C, 85C and 86C having mutually different lengths are connected by the same linear part 82C. The rhombic parts 93C, 94C, 95C and 96C having mutually different lengths are connected by the same linear part 92B. According to the configuration mentioned above, the range of wavelength of the electromagnetic wave convertible into the electron is secured in a more compact configuration. Further, the shortest distance between the rhombic parts 83C, 84C, 85C and 86C and the rhombic parts 93C, 94C, 95C and 96C facing each other in the direction of Z-axis is constant. As a result, the sensitivity of the electromagnetic wave can be secured in each of the photoelectric conversion units 23C, 24C, 25C and 26C.

In the example illustrated in FIG. 9, the meta-surface 22C includes the diamond antenna in place of the dipole antenna, as the antenna portion. The range of wavelength in which the diamond antenna has the sensitivity is wider than the range of wavelength in which the dipole antenna has the sensitivity. As a result, the electromagnetic waves having mutually different wavelength components can be simultaneously detected in spite of the more compact configuration.

Third Embodiment

Figure 10:
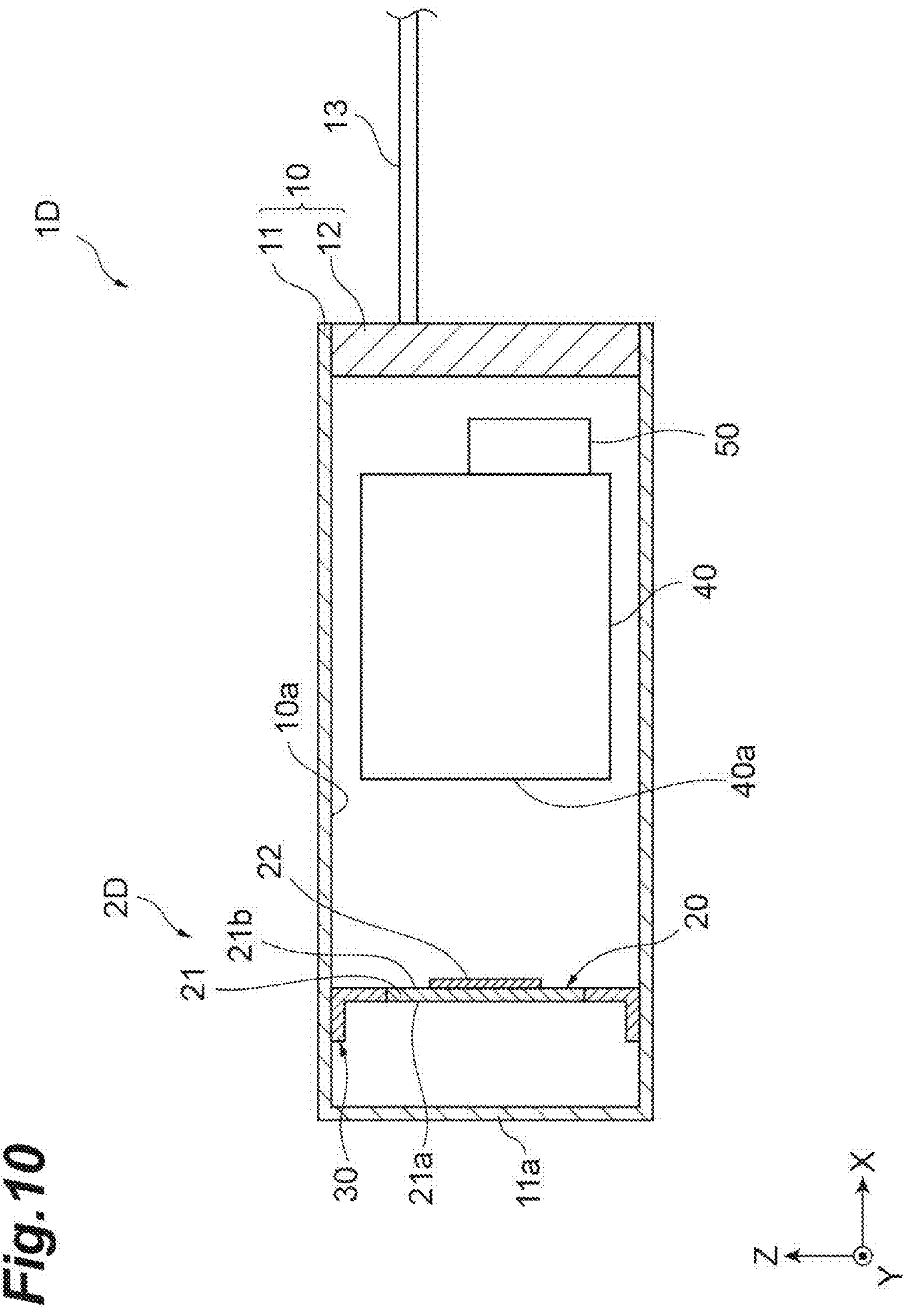
FIG. 10 is a perspective view of an electromagnetic wave detection device according to a third embodiment.

Next, a configuration of an electromagnetic wave detection device according to a third embodiment will be described with reference to FIG. 10. FIG. 10 is a perspective view of the electromagnetic wave detection device according to the second embodiment. The present embodiment is approximately similar to or the same as the embodiments and the modifications mentioned above. The present embodiment is different from the embodiments and the modifications mentioned above in a point that a meta-surface is of a passive type. Hereinafter, a different point from the embodiments mentioned above will be mainly described.

An electromagnetic wave detection device 1D includes a photoelectric conversion device 2D. The photoelectric conversion device 2D emits an electron in response to incidence of an electromagnetic wave. In the present embodiment, the electromagnetic wave detection device 1D detects the entered electromagnetic wave based on the electron emitted from the photoelectric conversion device 2D in response to incidence of the electromagnetic wave.

The electromagnetic wave detection device ID is provided with a housing 10, an electron emitter 20D, a holder 30, an electron multiplying unit 40, and an electron collecting unit 50. The electron emitter 20D, the holder 30, the electron multiplying unit 40 and the electron collecting unit 50 are disposed in the housing 10. The photoelectric conversion device 2D is provided with the housing 10 and the electron emitter 20D, and configures a part of the electromagnetic wave detection device 1. The electromagnetic wave detection device 1D according to the present embodiment is not provided with the power supply unit 60.

The electron emitter 20D emits an electron in response to incidence of the electromagnetic wave. The electron emitter 20D has a meta-surface 22D. The meta-surface 22D is of a passive type, and is operated without application of bias voltage. The meta-surface 22D is provided in the supporting body 21. The meta-surface 22D emits the electron in response to incidence of the electromagnetic wave.

The meta-surface 22D includes, for example, an oxide layer formed on a principal surface 21*b* of the supporting body 21, and a metal layer formed on the oxide layer. A material of the oxide layer includes, for example, a silicon dioxide and a titanium oxide. For example, the oxide layer includes a layer including the silicon dioxide and a layer including the titanium oxide. A material of the metal layer includes, for example, gold. In the present embodiment, the oxide layer is formed on the principal surface 21*b* of the supporting body 21 made of quartz, and the metal layer is formed on the oxide layer. For example, a thickness of the supporting body 21 is 525 μm, a thickness of the silicon dioxide of the meta-surface 22 is 1 μm, a thickness of the layer including the titanium dioxide of the meta-surface 22 is 10 nm, and a thickness of the metal layer of the meta-surface 22 is 200 nm. The meta-surface 22D is formed into a rectangular shape in a plan view. In a modification of the present embodiment, the meta-surface 22D may be provided in the principal surface 21*a*.

Figure 11A:
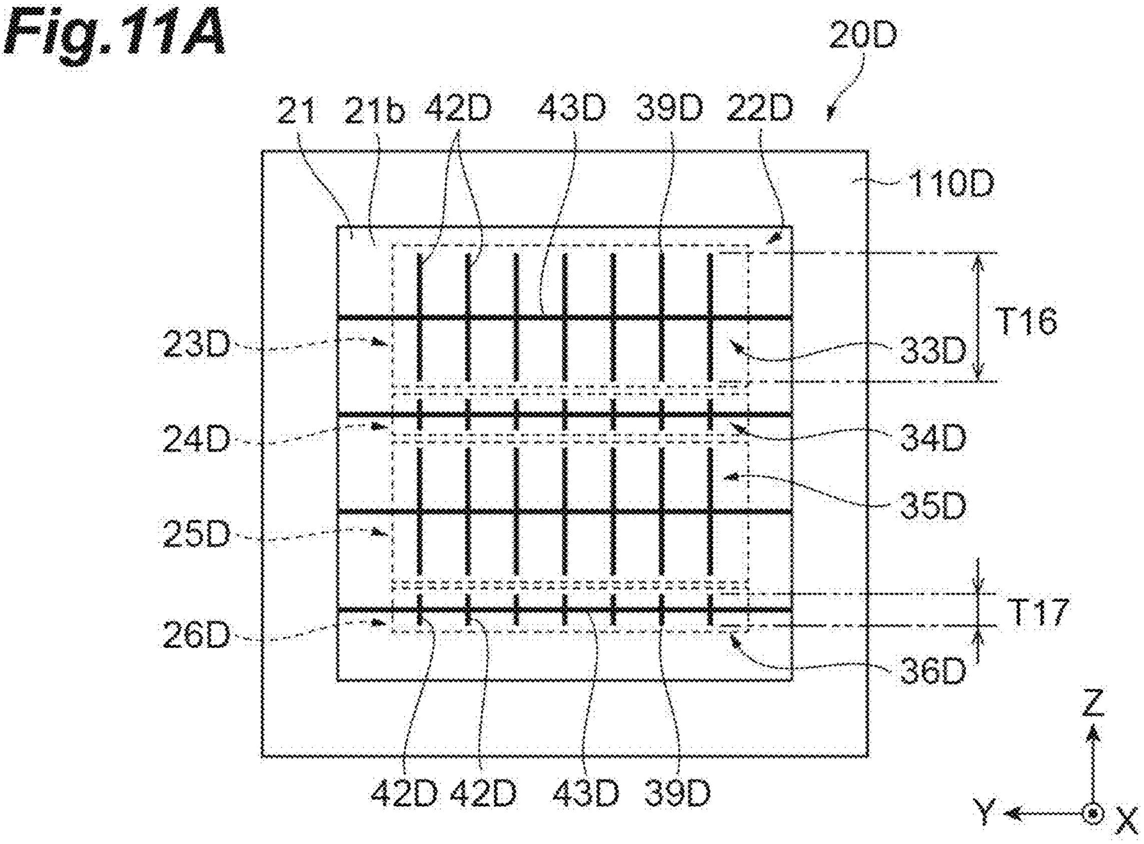
FIG. 11A is a plan view of an electron emitter according to the third embodiment.

Next, the photoelectric conversion device 2D will be described further in detail with reference to FIGS. 11A and 11B. FIG. 11A is a plan view of the electron emitter according to the third embodiment. The meta-surface 22D includes a plurality of photoelectric conversion units 23D, 24D, 25D and 26D. The photoelectric conversion units 23D, 24D, 25D and 26D are arranged in a direction of Z-axis.

The plurality of photoelectric conversion units 23D, 24D, 25D and 26D emits the electron in response to incidence of respectively corresponding wavelengths. The photoelectric conversion units 23D and 25D, and the photoelectric conversion units 24D and 26D correspond to the electromagnetic waves having mutually different wavelength regions. In other words, the photoelectric conversion units 23D and 25D, and the photoelectric conversion units 24D and 26D have the sensitivity for the electromagnetic waves having mutually different wavelength regions. The photoelectric conversion unit 23D and the photoelectric conversion unit 25D correspond to the electromagnetic wave in the same wavelength region. The photoelectric conversion unit 24D and the photoelectric conversion unit 26D correspond to the electromagnetic wave in the same wavelength region.

The photoelectric conversion units 23D, 24D, 25D and 26D have an equivalent electric potential. The photoelectric conversion units 23D, 24D, 25D and 26D are electrically connected to each other. As a modification of the present embodiment, the photoelectric conversion units 23D, 24D, 25D and 26D may be connected to the same electric potential, for example ground, without being electrically connected to each other.

In the present embodiment, the electromagnetic wave W entering the housing 10 enters the photoelectric conversion units 23D, 24D, 25D and 26D in the same manner as the example illustrated in FIG. 2. As a result, the photoelectric conversion unit corresponding to the wavelength of the electromagnetic wave W among the photoelectric conversion units 23D, 24D, 25D and 26D emits the electron in response to incidence of the electromagnetic wave W. The electron emitted from at least one of the photoelectric conversion units 23D, 24D, 25D and 26D is incident on the electron multiplying unit 40. The electron multiplied in the electron multiplying unit 40 is collected in the electron collecting unit 50.

As illustrated in FIG. 11A, the photoelectric conversion units 23D and 25D and the photoelectric conversion units 24D and 26D include patterns 33D, 34D, 35D and 36D having mutually different configurations. The patterns 33D and 35D of the photoelectric conversion units 23D and 25D and the patterns 34D and 36D of the photoelectric conversion units 24D and 26D have mutually different shapes. The photoelectric conversion unit 23D and the photoelectric conversion unit 25D include the patterns 33D and 35D having the same shape. The photoelectric conversion unit 24D and the photoelectric conversion unit 26D include the patterns 34D and 36D having the same shape. Each of the patterns 33D, 34D, 35D and 36D is a conductive line and conducts the electron. Each of the patterns 33D, 34D, 35D and 36D includes at least a metal layer formed on an oxide layer of the meta-surface 22. A material of the metal surface includes, for example, gold. The patterns 33D, 34D, 35D and 36D have an equivalent electric potential.

The electron emitter 20D is further provided with a frame pattern 110D. The frame pattern 110 is electrically connected to each of the patterns 33D, 34D, 35D and 36D. The patterns 33D, 34D, 35D and 36D are electrically connected to each other via the frame pattern 110. The frame pattern 110 is provided on a principal surface 21*b* of a supporting body 21. The frame pattern 110 is provided along an edge of the principal surface 21*b* so as to surround the patterns 33D, 34D, 35D and 36D. The frame pattern 110 is formed, for example, into a rectangular frame shape.

Each of the patterns 33D, 34D, 35D and 36D includes a plurality of linear parts 42D extending in a direction of Z-axis, and a linear part 43D extending in a direction of Y-axis and connecting the plurality of linear parts 42D. Each of the linear parts 42D and 43D is formed, for example, into a linear shape. For example, the plurality of linear parts 42D are in parallel to each other. The plurality of linear parts 42D have leading ends 39D. The leading end 39D of each of the patterns 33D, 34D, 35D and 36D is spaced away from the other linear part 42D and the linear part 43D in the same pattern, and from the other patterns. Although not being illustrated in FIG. 11A, each of the patterns 33D, 34D, 35D and 36D may include a line part facing the leading end 39D and is connected to the linear part 43D. Although not being illustrated in FIG. 11A, each of the patterns 33D, 34D, 35D and 36D may include a line part disposed so as to surround each of the linear parts 42D.

Each of the linear parts 42D emits the electron in response to incidence of the electromagnetic wave. In other words, the linear part 42D configures an antenna portion. The smaller the size of the antenna portion is, the more the field electron emission tends to be generated for an electromagnetic wave having a shorter wavelength, that is, an electromagnetic wave having a larger frequency. Each of the photoelectric conversion units 23D, 25D, 24D and 26D of the meta-surface 22D is configured to correspond to a frequency range, for example, between about 0.01 and 150 THz, that is, a frequency range between a so-called millimeter wave and an infrared light, by a change of the configuration of the linear part 42D.

The linear parts 42D of at least two photoelectric conversion units among the plurality of photoelectric conversion units 23D, 25D, 24D and 26D have mutually different lengths. For example, the linear parts 42D of the photoelectric conversion units 23D and 25D and the linear parts 42D of the photoelectric conversion units 24D and 26D have mutually different lengths T16 and T17. The lengths T16 and T17 of the linear parts 42D in the respective patterns 33D, 34D, 35D and 36D are a length in a direction of Z-axis from one leading end 39D to the other leading end 39D of the linear part 42D.

In each of the patterns 33D and 35D, the lengths T16 of the plurality of linear parts 42D are the same. In each of the patterns 34D and 36D, the lengths T17 of the plurality of linear parts 42D are the same. The lengths T16 and T17 of the linear parts 42D in each of the patterns 33D, 34D, 35D and 36D correspond to the wavelength regions of the electromagnetic wave which allow the electron to be emitted in each of the photoelectric conversion units 23D, 24D, 25D and 26D.

Figure 11B:
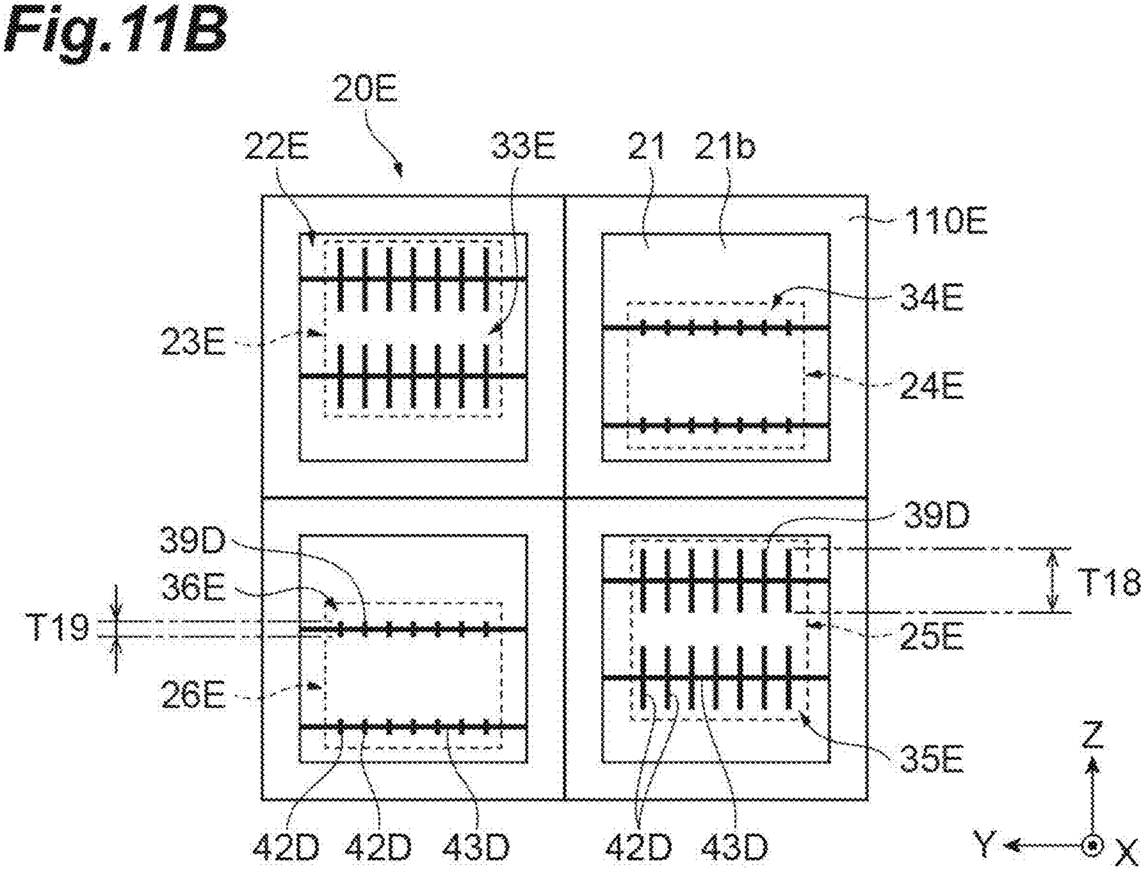
FIG. 11B is a plan view of an electron emitter according to a modification of the third embodiment.

FIG. 11B is a plan view of an electron emitter according to a modification of the present embodiment. A meta-surface 22E includes a plurality of photoelectric conversion units 23E, 24E, 25E and 26E. The photoelectric conversion units 23E, 24E, 25E and 26E are arranged like a matrix as viewed from a direction of X-axis.

The plurality of photoelectric conversion units 23E, 24E, 25E and 26E respectively emit the electron in response to incidence of the corresponding wavelengths. The photoelectric conversion units 23E and 25E and the photoelectric conversion units 24E and 26E correspond to the electromagnetic waves having mutually different wavelength regions. In other words, the photoelectric conversion units 23E and 25E and the photoelectric conversion units 24E and 26E have the sensitivity for the electromagnetic waves having mutually different wavelength regions. The photoelectric conversion unit 23E and the photoelectric conversion unit 25E correspond to the electromagnetic waves in the same wavelength region. The photoelectric conversion unit 24E and the photoelectric conversion unit 26E correspond to the electromagnetic waves in the same wavelength region. The photoelectric conversion units 23E, 24E, 25E and 26E have an equivalent electric potential. The photoelectric conversion units 23E, 24E, 25E and 26E are electrically connected to each other.

In the present modification, in the same manner as the example illustrated in FIG. 2, the electromagnetic wave W entering the housing 10 enters the photoelectric conversion units 23E, 24E, 25E and 26E. As a result, the photoelectric conversion unit corresponding to the wavelength of the electromagnetic wave W among the photoelectric conversion units 23E, 24E, 25E and 26E emits the electron in response to incidence of the electromagnetic wave W. The electron emitted from at least one of the photoelectric conversion units 23E, 24E, 25E and 26E enters the electron multiplying unit 40. The electron multiplied in the electron multiplying unit 40 is collected in the electron collecting unit 50.

As illustrated in FIG. 11B, the photoelectric conversion units 23E and 25E and the photoelectric conversion units 24E and 26E include patterns 33E, 34E, 35E and 36E having mutually different configurations. The patterns 33E and 35E of the photoelectric conversion units 23E and 25E and the patterns 34E and 36E of the photoelectric conversion units 24E and 26E have mutually different shapes. The photoelectric conversion unit 23E and the photoelectric conversion unit 25E include the patterns 33E and 35E having the same shape. The photoelectric conversion unit 24E and the photoelectric conversion unit 26E include the patterns 34E and 36E having the same shape. Each of the patterns 33E, 34E, 35E and 36E is a conductive line and conducts the electron. Each of the patterns 33E, 34E, 35E and 36E includes at least a metal layer which is formed on an oxide layer of the meta-surface 22. A material of the metal layer includes, for example, gold. The patterns 33E, 34E, 35E and 36E have an equivalent electric potential.

In the present modification, the electron emitter 20E is further provided with four frame patterns 110E connected to each other. Each of the frame patterns 110E is electrically connected to each of the patterns 33E, 34E, 35E and 36E. The patterns 33E, 34E, 35E and 36E are electrically connected to each other via each of the frame patterns 110E. Each of the frame patterns 110E is provided on the principal surface 21*b* of the supporting body 21. Each of the frame patterns 110E is provided so as to surround the corresponding patterns 33E, 34E, 35E and 36E. Each of the frame patterns 110E is formed, for example, into a rectangular frame shape. An area in which the photoelectric conversion unit 23E is provided, an area in which the photoelectric conversion unit 24E is provided, an area in which the photoelectric conversion unit 25E is provided, and an area in which the photoelectric conversion unit 26E is provided are partitioned by each of the frame patterns 110E.

Each of the patterns 33E, 34E, 35E and 36E includes a plurality of linear parts 42D extending in a direction of Z-axis, and a linear part 43D extending in a direction of Y-axis and connecting the plurality of linear parts 42D. Leading ends 39D of the plurality of linear parts 42D are spaced away from the other linear part 42D and linear part 43D having the same pattern and from the other patterns. Although not being illustrated in FIG. 9D, each of the patterns 33E, 34E, 35E and 36E may include a line part facing the leading end 39D and is connected to the linear part 43D. Although not being illustrated in FIG. 11B, the respective patterns 33E, 34E, 35E and 36E may include line parts arranged so as to surround each of the linear parts 42D.

The linear parts 42D of the photoelectric conversion units 23E and 25E and the linear parts 42D of the photoelectric conversion units 24E and 26E have mutually different lengths T18 and T19. In each of the patterns 33E and 35E, the lengths T18 of the plurality of linear parts 42D are the same. In each of the patterns 34E and 36E, the lengths T19 of the plurality of linear parts 42D are the same. The lengths T18 and T19 of the linear parts 42D in each of the patterns 33E, 34E, 35E and 36E correspond to the wavelength regions of the electromagnetic wave which allow the electron to be emitted in each of the photoelectric conversion units 23E, 24E, 25E and 26E.

As a modification of the third embodiment, the meta-surface 22D may have at least one of the photoelectric conversion units 23B, 24B, 25B, 26B and 27B and the photoelectric conversion units 23C, 24C, 25C and 26C in the modification of the second embodiment, in place of the photoelectric conversion units 23D, 24D, 25D and 26D. For example, in a case where the meta-surface 22D has the photoelectric conversion units 23B, 24B, 25B, 26B and 27B in place of the photoelectric conversion units 23D, 24D, 25D and 26D, both ends of the linear part 82B and the linear part 92B illustrated in FIG. 8 are connected to the frame pattern 110D. In a case where the meta-surface 22D has the photoelectric conversion units 23C, 24C, 25C and 26C in place of the photoelectric conversion units 23D, 24D, 25D and 26D, both ends of the linear part 82C and the linear part 92C illustrated in FIG. 9 are connected to the frame patterns 110D.

In the same manner, the meta-surface 22E may have at least one of the photoelectric conversion units 23B, 24B, 25B, 26B and 27B and the photoelectric conversion units 23C, 24C, 25C and 26C in the modification of the second embodiment, in place of the photoelectric conversion units 23E, 24E, 25E and 26E. For example, in a case where the meta-surface 22E has the photoelectric conversion units 23B, 24B, 25B, 26B and 27B in place of the photoelectric conversion units 23E, 24E, 25E and 26E, both ends of the linear part 82B and the linear part 92B illustrated in FIG. 8 are connected to the frame pattern 110E. In a case where the meta-surface 22E has the photoelectric conversion units 23C, 24C, 25C and 26C in place of the photoelectric conversion units 23E, 24E, 25E and 26E, both ends of the linear part 82C and the linear part 92C illustrated in FIG. 9 are connected to the frame patterns 110E.

Operation and Effect

In the photoelectric conversion devices 2 and 2D, the electron emitters 20, 20D and 20E include the meta-surfaces 22, 22A, 22B, 22C, 22D and 22E emitting the electron in response to incidence of the electromagnetic wave. The meta-surfaces 22, 22A, 22B, 22C, 22D and 22E respectively include the plurality of photoelectric conversion units having the sensitivity for the electromagnetic waves having mutually different wavelength regions. For example, the plurality of photoelectric conversion units 23, 24 and 25 of the meta-surface 22 include the patterns 33, 34 and 35 having mutually different configurations. The photoelectric conversion units 23 and 24 of the meta-surface 22 include the patterns 33 and 34 having mutually different shapes. The shape of the patterns 33 and 34 in each of the photoelectric conversion units 23 and 24 is considered to be associated with the wavelength region of the electromagnetic wave which allows the electron to be emitted in each of the photoelectric conversion units 23 and 24. The plurality of photoelectric conversion units 23 and 24 have the sensitivity for the electromagnetic wave having mutually different wavelength regions. Therefore, the photoelectric conversion device 2 has the sensitivity for the electromagnetic wave in the wavelength corresponding to the photoelectric conversion unit 23 and the electromagnetic wave in the wavelength corresponding to the photoelectric conversion unit 24. According to the configuration mentioned above, the photoelectric conversion unit 23 emits the electron in response to incidence of electromagnetic wave in the wavelength region corresponding to the photoelectric conversion unit 23, and the photoelectric conversion unit 24 emits the electron in response to incidence of the electromagnetic wave in the wavelength region corresponding to the photoelectric conversion unit 24. Same applies to the photoelectric conversion device 2B. As mentioned above, the range of wavelength of the electromagnetic wave convertible into the electron is enlarged in the photoelectric conversion devices 2 and 2D.

The electromagnetic wave detection devices 1 and 1D with the photoelectric conversion devices 2 and 2D are not required to be cooled and are not required to be provided with a spectroscope and an optical filter. In the photoelectric conversion devices 2 and 2D, the meta-surfaces 22, 22A, 22B, 22C, 22D and 22E emitting the electron in response to incidence of the electromagnetic wave are enlarged only by enlarging the areas in which the patterns are disposed. Therefore, in the electromagnetic wave detection devices 1 and 1D, the area which the electromagnetic wave enters can be enlarged more easily and more inexpensively than the detection device using the spectroscope or the optical filter.

The photoelectric conversion device 2 has the active-type meta-surfaces 22, 22A, 22B and 22C which are operated by applying the electric potentials. For example, in the meta-surface 22 of the photoelectric conversion device 2, the patterns 33 and 34 of the photoelectric conversion units 23 and 24 include the first section 37 and the second section 88 which are spaced away from each other. The second section 38 includes the leading end 39 facing the first section 37. The second section 38 emits the electron in response to incidence of the electromagnetic wave in the state where a lower electric potential than the electric potential of the first section 37 is applied thereto. In this case, the sensitivity of each of the photoelectric conversion units 23 and 24 is improved.

Further, in the meta-surface 22, the photoelectric conversion unit to be operated can be switched by controlling the application of electric potential to the first section 37 and the second section 38. For example, since the plurality of photoelectric conversion units 23 and 24 emit the electron in response to incidence of the electromagnetic wave having mutually different wavelength regions, the wavelength regions which allow the electron to be emitted can be switched by controlling the photoelectric conversion unit to be operated. Therefore, the range of wavelength of the electromagnetic wave which allows the electron to be emitted in the photoelectric conversion device 2 can be controlled by controlling the application of electric potential to the first section 37 and the second section 38. The photoelectric conversion device 2 can emit the electron in response to incidence of the electromagnetic wave having the wavelength component in the wavelength region corresponding to each of the photoelectric conversion units without any optical element such as the spectroscope and the optical filter.

The electromagnetic wave detection device 1 with the photoelectric conversion device 2 mentioned above can detect the electromagnetic wave per wavelength region corresponding to each of the photoelectric conversion units 23 and 24, for example, in the same manner as the detection by the spectroscopy. The electromagnetic wave detection device 1 can detect at one time, for example, whether or not the electromagnetic wave having the wavelength component in the plurality of wavelength regions exists. The electromagnetic wave detection device 1 can also enlarge or decrease the range of wavelength of the electromagnetic wave to be detected depending on the situation.

For example, in the meta-surface 22 of the photoelectric conversion device 2, the second section 38 of each of the photoelectric conversion units 23 and 24 includes the linear part 42 extending toward the first section 37. The linear part 42 of the photoelectric conversion unit 23 and the linear part 42 of the photoelectric conversion unit 24 have mutually different lengths. The wavelength region of the electromagnetic wave which allows the electron to be emitted in each of the photoelectric conversion units 23 and 24 changes depending on the length of the linear part 42. Therefore, the range of wavelength of the electromagnetic wave convertible into the electron in the photoelectric conversion device 2 can be enlarged by the simple configuration.

For example, in the plurality of photoelectric conversion units 23 and 24, the first section 37 or the second section 38 of the photoelectric conversion unit 23 is electrically connected to the first section 37 or the second section 38 of the photoelectric conversion unit 24. In the meta-surface 22, the second section 38 of the photoelectric conversion unit 23 is electrically connected to the second section 38 of the photoelectric conversion unit 24. In this case, the wavelength region of the electromagnetic wave convertible into the electron in the photoelectric conversion device 2 can be enlarged by the simple configuration.

The photoelectric conversion device 2 is provided, for example, with the potential control unit 62 controlling electric potentials applied to the first section 37 and the second section 38 of each of the photoelectric conversion units 23, 24 and 25. In this case, the photoelectric conversion unit to be operated can be selected by the potential control unit 62.

The potential control unit 62 controls, for example, electric potentials applied to the first and second sections 37 and 38 of the photoelectric conversion unit 23, and the first and second sections 37 and 38 of the photoelectric conversion unit 24. The electric potential difference between an electric potential applied to the first section 37 of the photoelectric conversion unit 23 and an electric potential applied to the second section 38 of the photoelectric conversion unit 23, and the electric potential difference between an electric potential applied to the first section 37 of the photoelectric conversion unit 24 and an electric potential applied to the second section 38 of the photoelectric conversion unit 24 may be different from each other. In this case, the photoelectric conversion unit 23 and the photoelectric conversion unit 24 can be separately operated. Therefore, the photoelectric conversion device 2 can change the range of wavelength of the electromagnetic wave convertible into the electron. In other words, the photoelectric conversion device 2 emits the electron in response to incidence of the electromagnetic wave having the wavelength component in a desired wavelength region among the plurality of wavelength regions corresponding to the plurality of photoelectric conversion units. Therefore, the electromagnetic wave detection device 1 can detect the electromagnetic wave per wavelength region corresponding to each of the photoelectric conversion units 23 and 24, for example, in the same manner as the detection by the spectroscopy. The electromagnetic wave detection device 1 can enlarge or decrease the range of wavelength of the electromagnetic wave to be detected depending on the situation.

The potential control unit 62 applies a higher electric potential than the electric potential applied to the first section 37 of the photoelectric conversion unit 23 to the second section 38 of the photoelectric conversion unit 23, for example, in a case where a lower electric potential than the electric potential applied to the first section 37 of the photoelectric conversion unit 24 is applied to the second section 38 of the photoelectric conversion unit 24. In this case, while the photoelectric conversion unit 24 is set to emit the electron in response to incidence of the electromagnetic wave, the emission of the electron in response to incidence of the electromagnetic wave from the photoelectric conversion unit 23 can be securely stopped.

The potential control unit 62 applies a lower electric potential than the electric potential applied to the first section 37 to the second section 38, for example, in at least two photoelectric conversion units among the plurality of photoelectric conversion units 23, 24 and 25. In this case, the at least two photoelectric conversion units are simultaneously operated. Therefore, for example, the conversion of the electromagnetic wave in the wavelength region corresponding to the photoelectric conversion unit 23 into the electron and the conversion of the electromagnetic wave in the wavelength region corresponding to the photoelectric conversion unit 24 into the electron can be simultaneously executed. Therefore, the electromagnetic wave detection device 1 can detect at one time, for example, whether or not the electromagnetic wave having the wavelength component in the plurality of wavelength regions exists.

The photoelectric conversion device 2D has the passive-type meta-surfaces 22D and 22E operating without application of electric potential. In this case, the electromagnetic wave detection device 1D with the photoelectric conversion device 2D can detect at one time, for example, whether or not the electromagnetic wave having the wavelength components in the plurality of wavelength regions exists. In the photoelectric conversion device 2D, the patterns 33D and 33E of the photoelectric conversion units 23D and 23E and the patterns 34D and 34E of the photoelectric conversion units 24D and 24E have an equivalent electric potential. In this case, the range of wavelength of the electromagnetic wave convertible into the electron in the photoelectric conversion device 2B can be enlarged by the simpler configuration.

In the photoelectric conversion device 2D, the patterns 33D and 33E of the photoelectric conversion units 23D and 23E and the patterns 34D and 34E of the photoelectric conversion units 24D and 24E are electrically connected to each other. In this case, the range of wavelength of the electromagnetic wave convertible into the electron in the photoelectric conversion device 2D can be enlarged with a simpler configuration.

In the photoelectric conversion device 2D, the pattern of each of the photoelectric conversion units 23D, 25D, 24D and 26D includes the linear part. The linear parts 42D of at least two photoelectric conversion units among the plurality of photoelectric conversion units 23D, 25D, 24D and 26D have mutually different lengths. For example, the linear parts 42D of the photoelectric conversion units 23D and 23E and the linear parts 42D of the photoelectric conversion units 24D and 24E have mutually different lengths. The wavelength region of the electromagnetic wave which allows the electron to be emitted in each of the photoelectric conversion units changed depending on the length of the linear part 42D. As a result, the range of wavelength of the electromagnetic wave convertible into the electron in the photoelectric conversion device 2D can be enlarged with a simpler configuration.

The electromagnetic wave detection devices 1 and 1D are further provided with the housing 10 which is airtightly sealed and has the window unit 11*a* transmitting the electromagnetic wave. The electron emitters 20 and 20D are disposed in the housing 10. In this case, an amount of emission of the electron in response to incidence of the electromagnetic wave can be improved by making the housing 10 vacuum or filling the housing 10 with the gas.

What is claimed is:

1. A photoelectric conversion device comprising:

an electron emitter including a meta-surface emitting an electron in response to incidence of an electromagnetic wave, wherein the meta-surface includes a plurality of photoelectric conversion units having a sensitivity for electromagnetic waves having mutually different wavelength regions, the plurality of photoelectric conversion units respectively include patterns having mutually different configurations, the pattern of each of the photoelectric conversion units includes first and second sections being spaced away from each other, and the second section includes a leading end facing the first section, and is configured to emit the electron in response to incidence of the electromagnetic wave when a lower electric potential than an electric potential of the first section is applied to the second section.

2. The photoelectric conversion device according to claim 1, wherein the second section of each of the photoelectric conversion units includes a linear part extending toward the first section, and the linear parts of at least two photoelectric conversion units among the plurality of photoelectric conversion units have mutually different lengths.

3. The photoelectric conversion device according to claim 1, wherein in two photoelectric conversion units among the plurality of photoelectric conversion units, the first or second section of one photoelectric conversion unit is electrically connected to the first or second section of the other photoelectric conversion unit.

4. The photoelectric conversion device according to claim 1, further comprising a potential control unit configured to control electric potentials applied to the first and second sections in each of the photoelectric conversion units.

5. The photoelectric conversion device according to claim 4, wherein the plurality of photoelectric conversion units include a first photoelectric conversion unit and a second photoelectric conversion unit, the potential control unit is configured to control electric potentials applied to the first and second sections of the first photoelectric conversion unit and the first and second sections of the second photoelectric conversion unit, and an electric potential difference between an electric potential applied to the first section of the first photoelectric conversion unit and an electric potential applied to the second section of the first photoelectric conversion unit, and an electric potential difference between an electric potential applied to the first section of the second photoelectric conversion unit and an electric potential applied to the second section of the second photoelectric conversion unit are different from each other.

6. The photoelectric conversion device according to claim 5, wherein the potential control unit is configured to apply a higher electric potential than the electric potential applied to the first section of the first photoelectric conversion unit to the second section of the first photoelectric conversion unit in a case of applying a lower electric potential than the electric potential applied to the first section of the second photoelectric conversion unit to the second section of the second photoelectric conversion unit.

7. The photoelectric conversion device according to claim 4, wherein the potential control unit is configured to apply a lower electric potential than the electric potential applied to the first section to the second section with regard to at least two photoelectric conversion units among the photoelectric conversion units.

8. The photoelectric conversion device according to claim 1, wherein the pattern of each of the photoelectric conversion units has a same electric potential.

9. The photoelectric conversion device according to claim 1, wherein the pattern of each of the photoelectric conversion units is electrically connected to each other.

10. The photoelectric conversion device according to claim 1, wherein the pattern of each of the photoelectric conversion units includes a linear part, and the linear parts of at least two photoelectric conversion units among the plurality of photoelectric conversion units have mutually different lengths.

11. The photoelectric conversion device according to claim 1, further comprising a housing configured to be airtightly sealed and have a window transmitting the electromagnetic wave, wherein the electron emitter is disposed within the housing.

12. A photoelectric conversion method comprising:

making an electromagnetic wave to be measured enter a meta-surface including a plurality of photoelectric conversion units, the plurality of photoelectric conversion units respectively including patterns having mutually different configurations;

emitting an electron from at least one photoelectric conversion unit corresponding to a wavelength region of the electromagnetic wave to be measured among the plurality of photoelectric conversion units; and controlling electric potentials applied to the plurality of photoelectric conversion units, wherein the pattern of each of the photoelectric conversion units includes a first section and a second section spaced away from the first section and has a leading end facing the first section, each of the photoelectric conversion units emits the electron in response to incidence of the electromagnetic wave in a state where a lower electric potential than an electric potential applied to the first section is applied to the second section, and electric potentials applied to the first and second sections of each of the photoelectric conversion units are controlled.

13. The photoelectric conversion method according to claim 12, wherein electric potentials applied to a first photoelectric conversion unit and a second photoelectric conversion unit which are included in the plurality of photoelectric conversion units are controlled in such a manner that an electric potential difference between an electric potential applied to the first section of the first photoelectric conversion unit and an electric potential applied to the second section of the first photoelectric conversion unit is different from an electric potential difference between an electric potential applied to the first section of the second photoelectric conversion unit and an electric potential applied to the second section of the second photoelectric conversion unit.

14. The photoelectric conversion method according to claim 12, wherein a higher electric potential than an electric potential applied to the first section of the first photoelectric conversion unit is applied to the second section of the first photoelectric conversion unit in a case where a lower electric potential than an electric potential applied to the first section of the second photoelectric conversion unit is applied to the second section of the second photoelectric conversion unit, and a higher electric potential than the electric potential applied to the first section of the second photoelectric conversion unit is applied to the second section of the second photoelectric conversion unit in a case where a lower electric potential than the electric potential applied to the first section of the first photoelectric conversion unit is applied to the second section of the first photoelectric conversion unit.

15. The photoelectric conversion method according to claim 12, wherein in at least two photoelectric conversion units among the plurality of photoelectric conversion units, a lower electric potential than the electric potential applied to the first section is applied to the second section.

16. The photoelectric conversion device according to claim 8, wherein the pattern of each of the photoelectric conversion units includes a linear part, and the linear parts of at least two photoelectric conversion units among the plurality of photoelectric conversion units have mutually different lengths.

17. The photoelectric conversion device according to claim 9, wherein the pattern of each of the photoelectric conversion units includes a linear part, and the linear parts of at least two photoelectric conversion units among the plurality of photoelectric conversion units have mutually different lengths.

* * * * *